(12) United States Patent
Ancimer et al.

(10) Patent No.: US 12,381,238 B2
(45) Date of Patent: Aug. 5, 2025

(54) SYSTEMS AND METHODS TO MEASURE OR CONTROL FUEL CELL STACK EXCESS HYDROGEN FLOW USING HUMIDITY

(71) Applicant: CUMMINS INC., Columbus, IN (US)

(72) Inventors: Richard J. Ancimer, Toronto (CA); Aleksey Yezerets, Columbus, IN (US); Tyler Rash, Columbus, IN (US); Leta Woo, Atlanta, GA (US)

(73) Assignee: CUMMINS INC., Columbus, IN (US)

( * ) Notice: Subject to any disclaimer, the term of this patent is extended or adjusted under 35 U.S.C. 154(b) by 486 days.

(21) Appl. No.: 17/898,059

(22) Filed: Aug. 29, 2022

(65) Prior Publication Data

US 2023/0084837 A1    Mar. 16, 2023

Related U.S. Application Data

(60) Provisional application No. 63/242,939, filed on Sep. 10, 2021.

(51) Int. Cl.
| | |
|---|---|
| *H01M 8/04492* | (2016.01) |
| *H01M 8/04089* | (2016.01) |
| *H01M 8/04746* | (2016.01) |

(52) U.S. Cl.
CPC ....... *H01M 8/045* (2013.01); *H01M 8/04089* (2013.01); *H01M 8/04097* (2013.01); *H01M 8/04514* (2013.01); *H01M 8/04753* (2013.01); *H01M 8/04776* (2013.01); *H01M 2250/20* (2013.01)

(58) Field of Classification Search
None
See application file for complete search history.

(56) References Cited

U.S. PATENT DOCUMENTS

| | | | |
|---|---|---|---|
| 6,541,141 B1 | 4/2003 | Frank et al. | |
| 7,018,732 B2 | 3/2006 | Cargnelli et al. | |
| 8,323,840 B2 | 12/2012 | Lee et al. | |
| 9,368,814 B2 | 6/2016 | Forte | |
| 10,164,275 B2 | 12/2018 | Aoki et al. | |
| 2008/0014472 A1* | 1/2008 | Logan | H01M 8/04097 429/513 |
| 2009/0155651 A1* | 6/2009 | Orihashi | H01M 8/04119 429/413 |
| 2009/0208789 A1 | 8/2009 | Janarthanam et al. | |
| 2013/0164641 A1 | 6/2013 | Fukuda et al. | |
| 2017/0092972 A1 | 3/2017 | Pence | |
| 2019/0237784 A1 | 8/2019 | Rama et al. | |
| 2019/0245221 A1 | 8/2019 | Scotto et al. | |
| 2020/0161671 A1 | 5/2020 | Ballantine et al. | |
| 2022/0416278 A1* | 12/2022 | Ancimer | H01M 8/04432 |
| 2024/0128482 A1* | 4/2024 | Ancimer | H01M 8/04097 |
| 2024/0290997 A1* | 8/2024 | Ancimer | H01M 8/04111 |

FOREIGN PATENT DOCUMENTS

| | | | |
|---|---|---|---|
| CN | 112786926 | * | 5/2021 |
| DE | 102007004590 | | 7/2008 |
| EP | 3249728 | | 11/2017 |

* cited by examiner

*Primary Examiner* — Jonathan Crepeau
(74) *Attorney, Agent, or Firm* — Barnes & Thornburg LLP

(57) ABSTRACT

The present disclosure generally relates to systems and methods for managing and/or excess hydrogen flow in a system comprising a fuel cell or fuel cell stack based on humidity measurements.

20 Claims, 5 Drawing Sheets

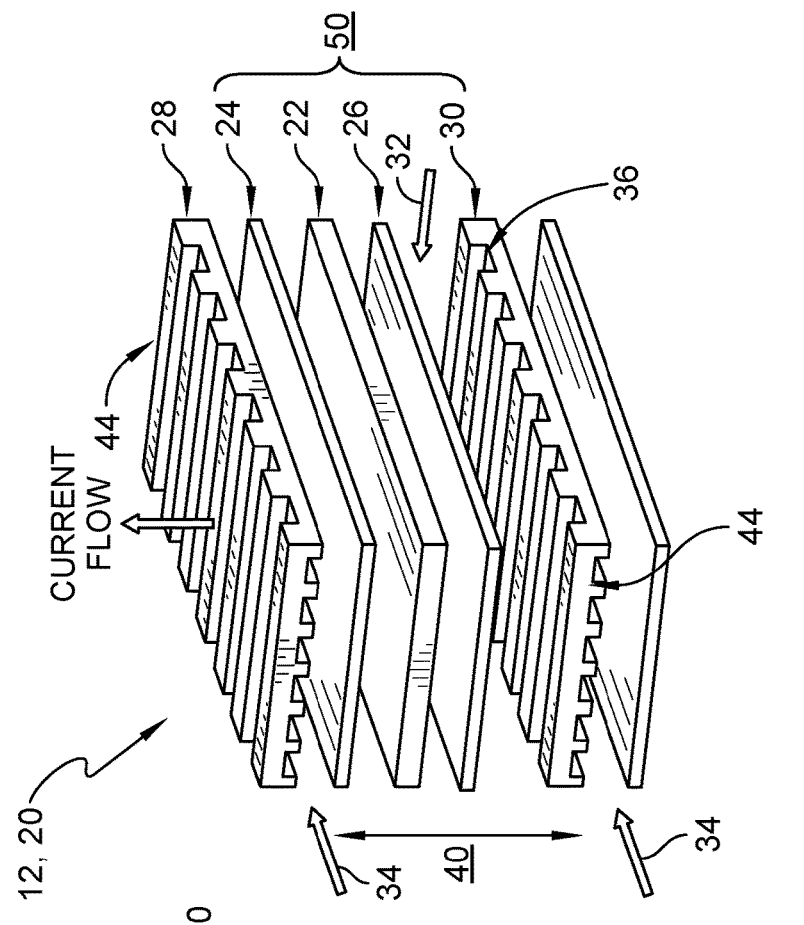
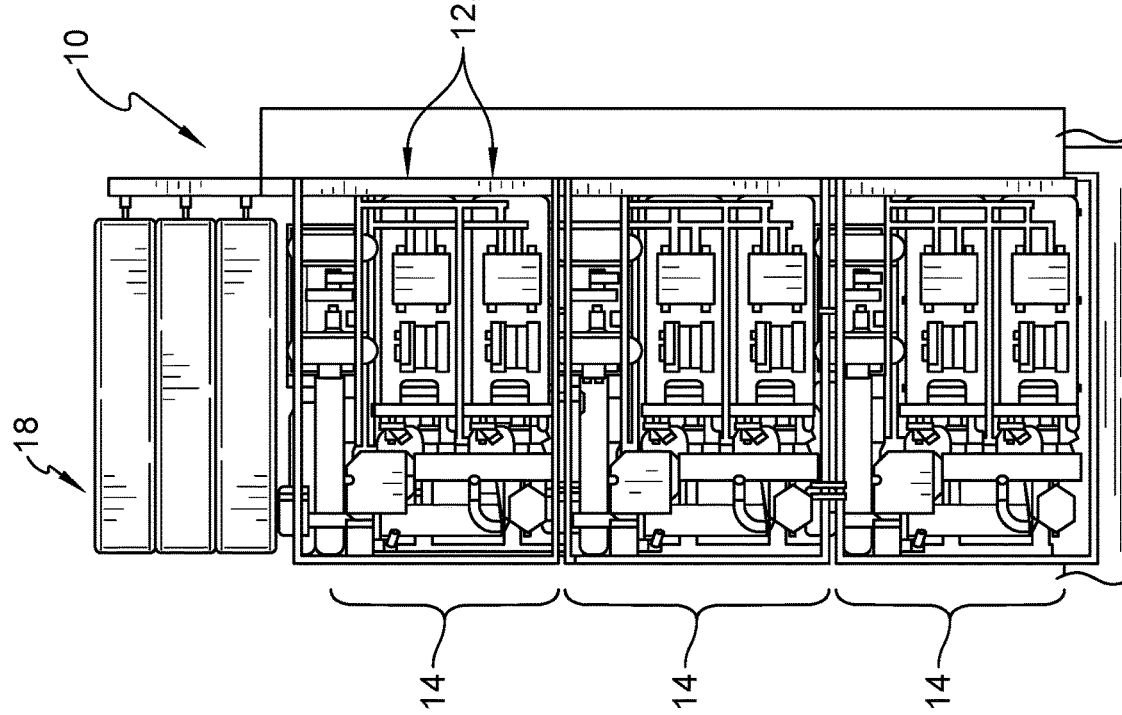
FIG. 1C
FIG. 1B

SYSTEMS AND METHODS TO MEASURE OR CONTROL FUEL CELL STACK EXCESS HYDROGEN FLOW USING HUMIDITY

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/242,939 filed on Sep. 10, 2021, the entire disclosure of which is hereby expressly incorporated herein by reference.

TECHNICAL FIELD

The present disclosure relates to systems and methods for measuring, managing, and/or controlling excess hydrogen flow in a system comprising a fuel cell or a fuel cell stack based on humidity measurements.

BACKGROUND

Vehicles and/or powertrains use fuel cells, fuel cell stacks, and/or fuel cell systems for their power needs. A minimum excess fuel target for a fuel cell system may be specified as a minimum level of an excess fuel target required by the fuel cell or fuel cell stack based on the operating conditions of the fuel cell, stack, or system. A fuel cell or fuel cell stack may have an excess fuel level higher than the minimum excess fuel target, but achieving that higher level may result in a high parasitic load on the fuel cell or fuel cell stack. For example, excess fuel level higher than the minimum excess fuel target may be achieved by maintaining high fuel flow rates at the anode, which may lead to a pressure loss in the fuel cell, stack, or system.

If the minimum level of excess fuel is not achieved, the performance or efficiency of the fuel cell or fuel cell stack may be reduced. Additionally, the rate of reversible and/or irreversible aging of the fuel cell membrane electrode assembly (MEA) may increase, leading to permanent reduction in efficiency or a shorter fuel cell life. This may require earlier replacement of the fuel cell or fuel cell stack at additional costs.

Currently, there are no methods or systems that enable a fuel management system to directly measure the excess fuel level in a system comprising a fuel cell or a fuel cell stack. The present disclosure relates to systems and methods of using sensor technology to measure water content in the fuel cell or the fuel cell stack, and using the measurements to determine the excess fuel ratio in the system comprising a fuel cell or a fuel cell stack

SUMMARY

Embodiments of the present disclosure are included to meet these and other needs.

In one aspect of the present disclosure, described herein, a fuel cell stack system includes a first flow stream, a second flow stream, and a controller. The first flow stream and the second flow stream mix to form a third flow stream, and the third flow stream flows through an anode inlet manifold in a fuel cell stack of the fuel cell stack system. The second flow stream is a recirculated flow stream. The controller compares an excess fuel ratio of the fuel cell stack system to a target excess fuel ratio of the fuel cell stack system based on water content in the first flow stream, the second flow stream, and the third flow stream.

In some embodiments, the fuel cell stack system may further include a blower, an ejector, or a by-pass valve. In some embodiments, the controller may determine when to operate the blower or may determine blower speed based on the excess fuel ratio. In some embodiments, the controller may determine the operation of the by-pass valve based on the excess fuel ratio. In some embodiments, the fuel cell stack system may include at least a first ejector and a second ejector, and the controller may determine whether to operate the first ejector, the second ejector, or both the first and second ejectors depending on the excess fuel ratio.

In some embodiments, the fuel cell stack system may include at least one physical or virtual sensor. In some embodiments, the physical or virtual sensor may have a humidity sensor at the anode inlet manifold. The humidity sensor may determine a humidity measurement at the anode inlet manifold.

In some embodiments, the controller may determine a high humidity threshold and a low humidity threshold based on an effective dryness at the anode inlet manifold depending on operating conditions comprising temperature, pressure, or current density or based on conditions that can cause starvation or flooding within the fuel cell stack. The controller may determine a target usable parameter based on the high humidity threshold and the low humidity threshold. The target usable parameter may include a target dew point at a given pressure condition, or a target entrainment ratio of the fuel cell stack system.

In some embodiments, the controller may convert the humidity measurement to a measured usable parameter. The measured usable parameter may include a measured dew point at a given pressure condition, or a measured entrainment ratio of the fuel cell stack system. The controller may compare the measured usable parameter to a target usable parameter. In some embodiments, the controller may determine operation or speed of a blower, operation of a by-pass valve, or operation of one or more ejectors in the fuel cell stack system based on the comparison between the target usable parameter and the measured usable parameter.

In some embodiments, the humidity sensor may be regenerated. The frequency of regeneration may depend on operating conditions of the fuel cell stack system, time of operation the fuel cell stack system or performance diagnostics of the humidity sensor. In some embodiments, the humidity sensor may be regenerated by using dry hydrogen gas.

In some embodiments, the physical or virtual sensor may be a sound sensor at the anode inlet manifold. The sound sensor may determine a speed of sound measurement at the anode inlet manifold.

In some embodiments, the controller may determine a high humidity threshold and a low humidity threshold based on an effective dryness at the anode inlet manifold depending on operation conditions comprising temperature, pressure, or current density or based on conditions that can cause starvation or flooding at the anode inlet manifold. The controller may determine a target usable parameter based on the high humidity threshold and the low humidity threshold. The target usable parameter may include a target speed of sound.

In some embodiments, the controller may convert the speed of sound measurement to a measured usable parameter. The controller may compare the measured usable parameter to a target usable parameter. In some embodiments, the controller may determine operation or speed of a blower, operation of a by-pass valve, or operation of one or more ejectors in the fuel cell stack system based on a comparison between the target usable parameter and the measured usable parameter.

In a second aspect of the present disclosure, a method of determining an excess fuel ratio of a fuel cell stack system includes the steps of flowing a first flow stream and a second flow stream, mixing the first flow stream and the second flow stream to form a third flow stream, flowing the third flow stream flowing through an anode inlet manifold in a fuel cell stack, and comparing an excess fuel ratio of the fuel cell stack system to a target excess fuel ratio of the fuel cell stack system based on water content in the first flow stream, the second flow stream, and the third flow stream by a controller. The second flow stream is a recirculated flow stream.

In some embodiments, the method may further include the controller determining when to operate a blower, determining the blower speed, or determining the operation of a by-pass valve based on the excess fuel ratio. In some embodiments, the fuel cell stack system may include at least one physical or virtual sensor. The physical or virtual sensor may be a humidity sensor at the anode inlet manifold, and the humidity sensor may determine a humidity measurement at the anode inlet manifold. In some embodiments, the fuel cell stack system may include at least one physical or virtual sensor. The physical or virtual sensor may be a sound sensor at the anode inlet manifold, and the sound sensor may determine a speed of sound measurement at the anode inlet manifold.

BRIEF DESCRIPTION OF THE DRAWINGS

These and other features, aspects, and advantages of the present invention will become better understood when the following detailed description is read with reference to the accompanying drawings, in which like characters represent like parts throughout the drawings, wherein:

FIG. 1B is an illustration of a fuel cell system having fuel cell modules, each fuel cell module having fuel cell stacks and/or fuel cells.

FIG. 1C is an illustration of components of a fuel cell in the fuel cell stack.

DETAILED DESCRIPTION

The present disclosure relates to systems and methods for managing and/or excess hydrogen flow in a system comprising a fuel cell 20 or fuel cell stack 12. The present disclosure also relates systems and methods for using sensor technologies to measure water content in a fuel cell 20 or fuel cell stack 12. More specifically, this disclosure relates to measuring the relative humidity of the fuel stream entering the anode of a fuel cell or fuel cell stack and comparing it to the dry primary fuel as a reference point.

Figure 1A:
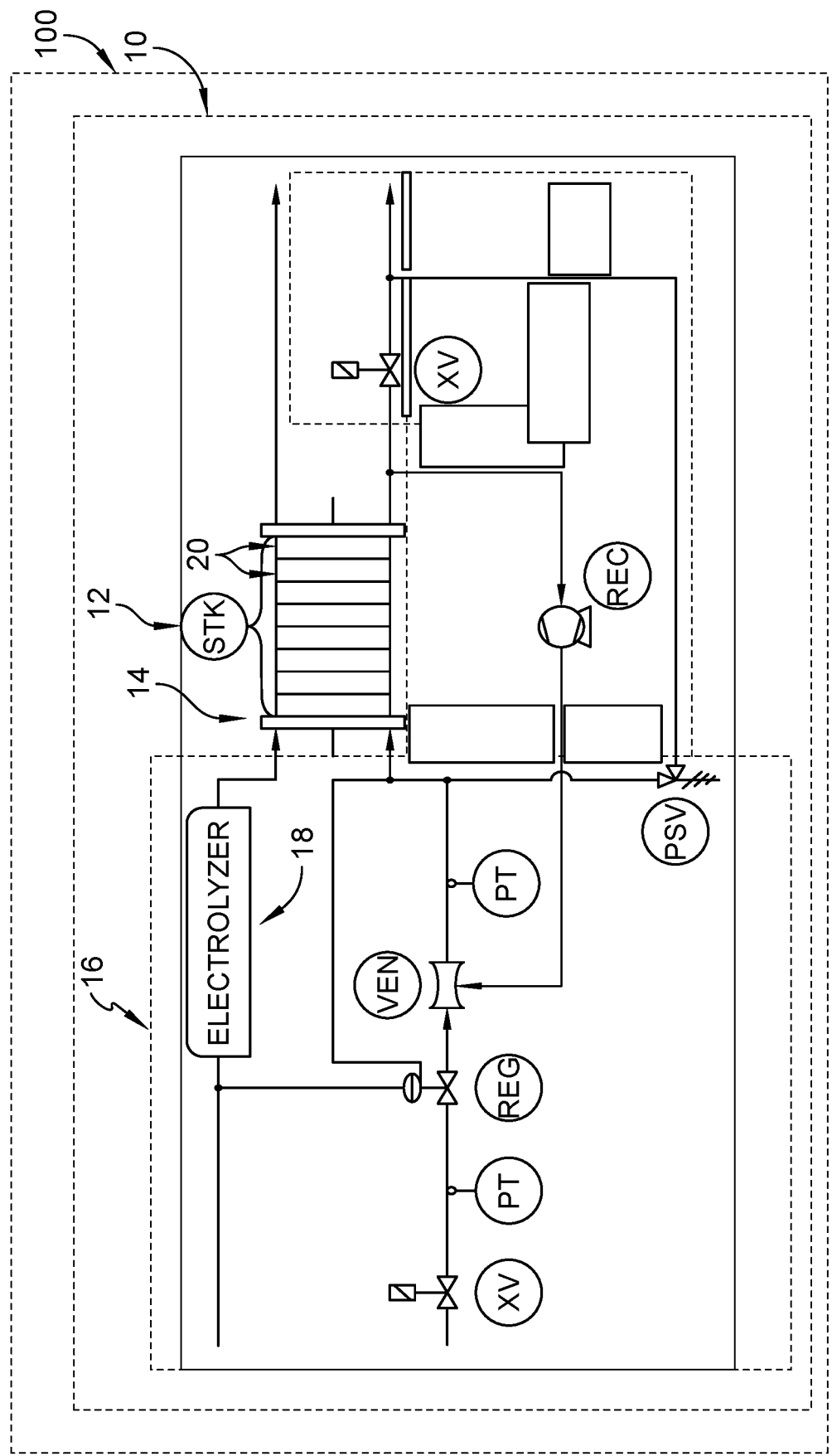
FIG. 1A is an illustration of a fuel cell system including one or more fuel cell stacks connected to a balance of plant.

As shown in FIG. 1A, fuel cell systems 10 often include one or more fuel cell stacks 12 or fuel cell modules 14 connected to a balance of plant (BOP) 16, including various components, to create, generate, and/or distribute electrical power for meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 connected together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layer (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26. The above mentioned components, 22, 24, 26, 30 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plate (BPP) 28, 30 can uniformly distribute reactants 32, 34 to an active area 40 of each fuel cell 20 through oxidant flow fields 42 and/or fuel flow fields 44. The active area 40, where the electrochemical reactions occur to generate electrical power produced by the fuel cell 20, is centered within the gas diffusion layer (GDL) 24, 26 and the bipolar plate (BPP) 28, 30 at the membrane electrode assembly (MEA) 22. The bipolar plate (BPP) 28, 30 are compressed together to isolate and/or seal one or more reactants 32 within their respective pathways, channels, and/or flow fields 42, 44 to maintain electrical conductivity, which is required for robust during fuel cell 20 operation.

The fuel cell system 10 described herein, may be used in stationary and/or immovable power system, such as industrial applications and power generation plants. The fuel cell system 10 may also be implemented in conjunction with electrolyzers 18 and/or other electrolysis system 18. In one embodiment, the fuel cell system 10 is connected and/or attached in series or parallel to an electrolysis system 18, such as one or more electrolyzers 18 in the BOP 16 (see FIG. 1A). In another embodiment, the fuel cell system 10 is not connected and/or attached in series or parallel to an electrolysis system 18, such as one or more electrolyzers 18 in the BOP 16.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

A fuel cell 20 or fuel cell stack 12 power module may comprise a fuel management system that controls, manages, implements, or determines the flow of the primary fuel (e.g., hydrogen) as a fuel stream to the anode. The fuel flow control may occur through an anode inlet at a rate that matches, exceeds, or is less than the fuel consumption rate of the fuel cell or fuel cell stack. The fuel flow control may depend on the recirculation rate of the fuel stream exhaust from the fuel cell 20 or fuel cell stack 12 outlet back to the anode inlet. The fuel flow control may depend on the operation of the fuel cell 20 or fuel cell stack 12 at a target pressure. The fuel flow control may depend on the maintenance of a pressure differential between the anode and cathode streams within a specified target range.

A blower and/or a pump (e.g., a recirculation pump) may function at a capacity proportional to the pressure loss in the fuel cell 20 or fuel cell stack 12. The blower and/or the pump may also function at a capacity proportional to the volumetric flow rate through the blower and/or the pump. The blower and/or a pump may use additional power to compensate for the pressure loss. Use of additional power by the blower and/or the pump may result in a high parasitic load on the fuel cell 20 or fuel cell stack 12.

Figure 2:
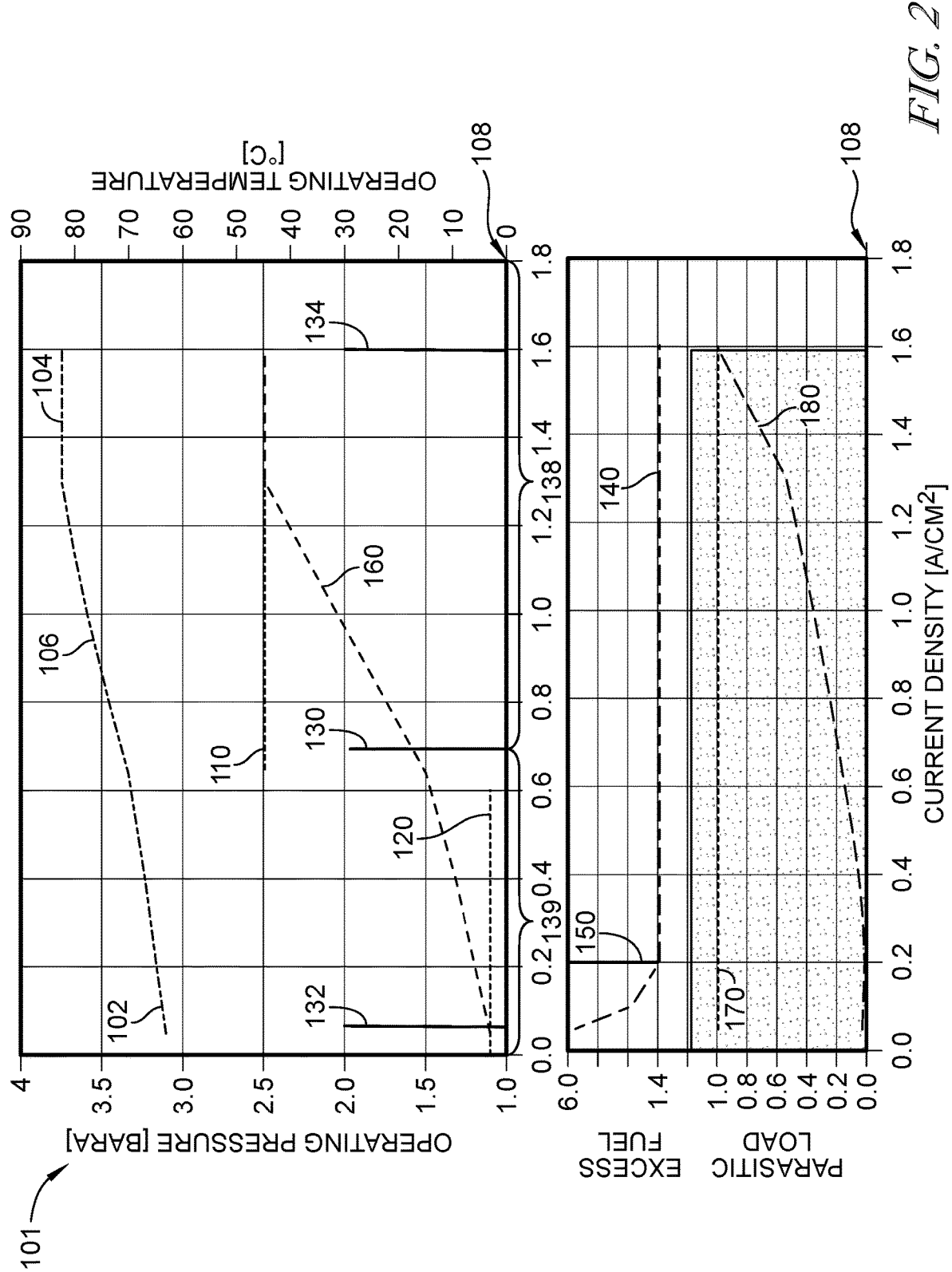
FIG. 2 is a graph showing the operating curves of a system comprising a fuel cell or fuel cell stack.

One embodiment of the operating characteristics of fuel cell system 10 comprising a fuel cell system 10 comprising a fuel cell 20 or fuel cell stack 12 is illustrated in graph 101 in FIG. 2. Operating pressures and the associated operating temperatures are shown as a function of current density 108. The fuel cell 20 or fuel cell stack 12 may be required to operate within a pressure range known as anode inlet manifold pressure ($P_{AIM}$) measured at the anode inlet manifold 404 shown in FIG. 3.

A highest anode inlet manifold pressure ($P_{AIM\_HI}$) of a fuel cell 20 or fuel cell stack 12 is denoted by 110. A lowest anode inlet manifold pressure ($P_{AIM\_HI}$) of a fuel cell 20 or fuel cell stack 12 is denoted by 120. The range 160 between the highest anode inlet manifold pressure ($P_{AIM\_HI}$) 110 and the lowest anode inlet manifold pressure ($P_{AIM\_LO}$) 120 indicates a target anode inlet manifold pressure range or operating pressure. A target temperature of the fuel cell system 10 may range from a low fuel supply operating temperature ($T_{CV\_LO}$) 102 to a high fuel supply operating temperature ($T_{CV\_HI}$) 104.

It is critical to operate the fuel cell 20 or fuel cell stack 12 at a pressure that ranges from about or approximately the highest anode inlet manifold pressure ($P_{AIM\_HI}$) 110 to about or approximately the lowest anode inlet manifold pressure ($P_{AIM\_LO}$) 120 when the fuel cell 20 or fuel cell stack 12 is operating above a critical current density ($i_{\_LO\_CR}$) 130. In some embodiments, the critical current density ($i_{\_LO\_CR}$) 130 may be at about 0.7 A/cm². In other embodiments, the critical current density ($i_{\_LO\_CR}$) 130 may be at about 0.6 A/cm². In some further embodiments, the critical current density ($i_{\_LO\_CR}$) 130 may be higher or lower than 0.7 A/cm², such as ranging from about 0.5 A/cm² to about 0.9 A/cm², including every current density 108 or range of current density 108 comprised therein.

The fuel cell 20 or fuel cell stack 12 may operate at a high current density 138, which may be higher than the critical current density ($i_{\_LO\_CR}$) 130. The high current density 138 may range from about 1.3 A/cm² to about 2.0 A/cm², or about 1.3 A/cm² to about 1.6 A/cm², or about 1.0 A/cm² to about 1.6 A/cm², including every current density 108 or range of current density 108 comprised therein.

In some embodiments, operating the fuel cell 20 or fuel cell stack 12 at such high current density 138 (e.g., at about 1.6 A/cm²) will result in operating the fuel cell 20 or fuel cell stack 12 at pressures and temperatures different from optimal target operating pressures and operating temperatures. Operating the fuel cell 20 or fuel cell stack 12 at pressures and temperatures different from the optimal target operating pressures and operating temperatures may lower the efficiency of the fuel cell 20 or fuel cell stack 12. Such operation may also result in damage to the fuel cell 20 or fuel cell stack 12 because of MEA 22 degradation (e.g., due to starvation, flooding and/or relative humidity effects). In some embodiments, there may be more flexibility in the fuel cell 20 or fuel cell stack 12 operating pressure and operating temperature when the fuel cell 20 or fuel cell stack 12 is operating below the critical current density ($i_{\_LO\_CR}$) 130. The present operating system comprising the fuel cell or fuel cell stack can operate at a minimum current density ($i_{MIN}$) 132 and/or a maximum current density ($i_{MAX}$) 134.

In one embodiment, the fuel cell system 10 comprising the fuel cell 20 or fuel cell stack 12 may operate in a functional range that may be different than that indicated by the curve 160 in FIG. 2. The fuel cell system 10 may operate at higher pressures (e.g., the highest anode inlet manifold pressure ($P_{AIM\_HI}$) 110) or at a current density 108 as low as the critical current density ($i_{\_LO\_CR}$) 130. For example, the fuel cell system 10 may extend steady state operation at about 2.5 bara down to about the critical current density ($i_{\_LO\_CR}$) 130. Pressure measurements in bara refer to the absolute pressure in bar.

Figure 3:
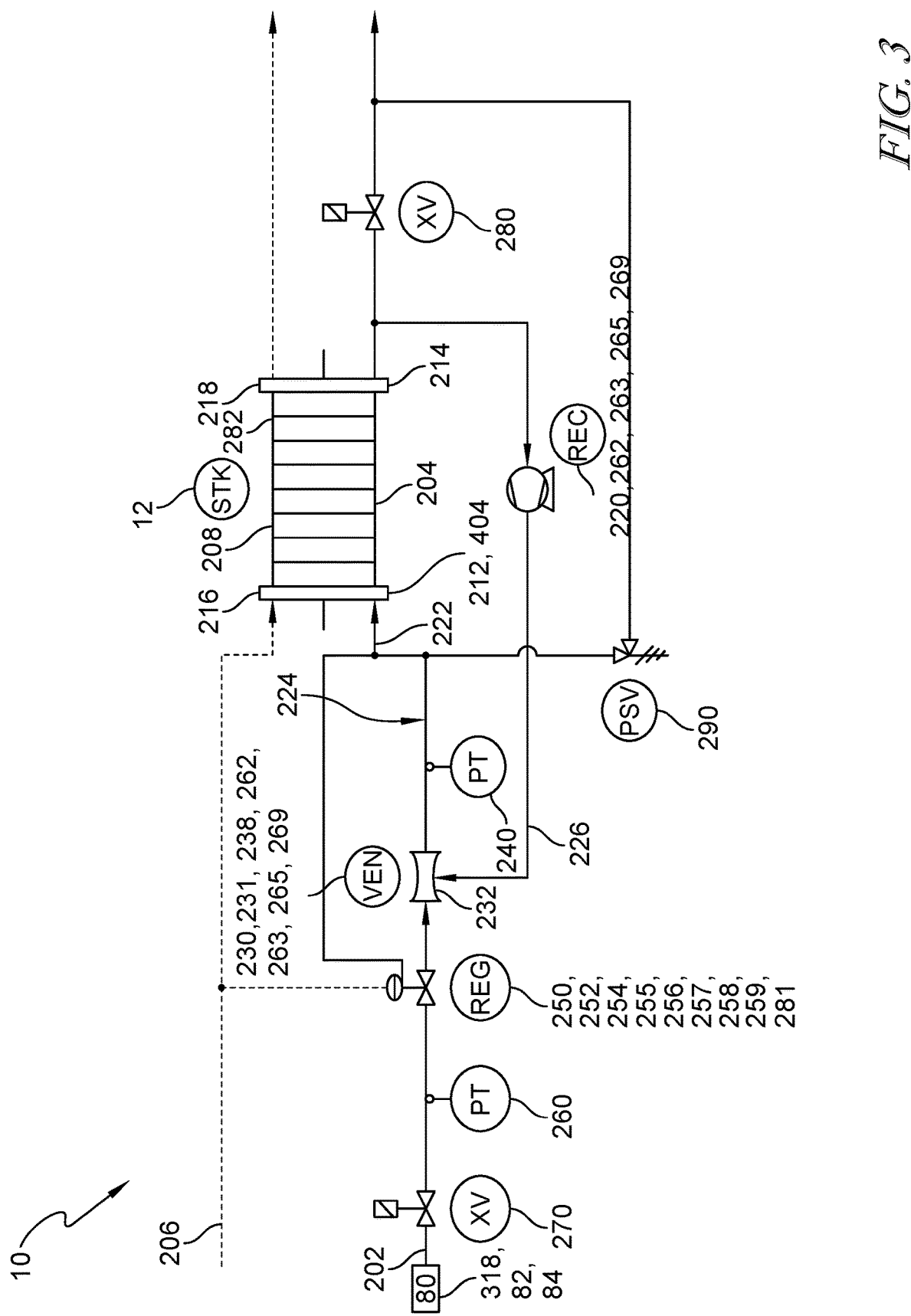
FIG. 3 is a schematic showing an embodiment of a venturi or ejector in a fuel cell stack system.

FIG. 3 illustrates one embodiment of a fuel cell system 10 comprising a fuel cell stack 12, a mechanical regulator 250, a recirculation pump or blower 220 in series or in parallel to the fuel cell stack 12, an exhaust valve 280, a purge valve 284, a shut off valve 270, a pressure transfer valve 290, one or more pressure transducers 240/260, and a venturi or an ejector 230. In some embodiments, the fuel cell system 10 may comprise one or more fuel cell stacks 12 and/or one or more fuel cells 20. In other embodiments, there may also be one or multiple valves, sensors, compressors, regulators, blowers, injectors, ejectors, and/or other devices in series or in parallel with the fuel cell stack 12.

In one embodiment of the fuel cell system 10, an anode inlet stream 222, flows through an anode 204 end of the fuel cell stack 12. Typically, the anode inlet stream 222 may be a mixture of fresh fuel (e.g., $H_2$) and anode exhaust (e.g., $H_2$ fuel and/or water). Conversely, oxidant 206 (e.g., air, oxygen, or humidified air) may flow through the cathode 208 end of the fuel cell stack 12.

Excess fuel may be provided at an anode inlet 212 to avoid fuel starvation towards an anode outlet 214. In some embodiments, the excess fuel ratio ($\lambda_{H2}$) may be greater than or equal to about 1.3 to avoid fuel starvation. Recirculated flow may be provided at the anode inlet 212 to support humidification of the membrane electrode assembly (MEA) 22. Water content of the anode inlet stream 222 or the relative humidity of the anode inlet stream 222 may impact the performance and health of the fuel cell stack 12. For example, low inlet humidity may lead to a drier MEA 22 resulting in reduced performance Low inlet humidity may also induce stresses that can lead to permanent damage to the MEA 22.

In some embodiments, the humidity level in a fuel cell 20 or fuel cell stack 12 may be determined by the effective dryness perceived by the membrane electrode assembly (MEA). There may be many factors that influence this effective dryness. For example, a target anode gas inlet relative humidity or target relative humidity may describe an effective dryness that is optimal or acceptable for a given MEA 22 design. The optimal or acceptable effective dryness and thus, the target anode gas inlet relative humidity may be dependent on the operating conditions of the fuel cell 20 or fuel cell stack 12. If the humidity level is below the target anode gas inlet relative humidity, it may lead result in reduced performance of the fuel cell 20 or fuel cell stack 12. If the humidity level is below the target anode inlet relative humidity, it may also induce stresses that may lead to permanent damage to the MEA 22.

The target anode gas inlet relative humidity is based on the anode gas conditions at the inlet to the active portion of the MEA 22 of the fuel cell 20 or fuel cell stack 12, and not based on the anode gas inlet manifold temperature. The anode inlet manifold pressure ($P_{AIM}$) may be about the same as the fuel cell or fuel cell stack operating pressure. The operating temperature of a fuel cell 20 or fuel cell stack 12 may comprises an anode fuel cell or anode fuel cell stack operating temperature and a cathode fuel cell or cathode fuel cell stack operating temperature.

The target anode gas inlet relative humidity may be defined at the anode inlet manifold pressure ($P_{AIM}$) or the fuel cell or fuel cell stack operating pressure and anode fuel cell or anode fuel cell stack operating temperature. If the target anode gas inlet relative humidity at the anode inlet manifold temperature is known, the target anode gas inlet relative humidity at the anode fuel cell or anode fuel cell stack operating temperature may need to account for any difference in temperature between the anode inlet manifold temperature and the anode fuel cell or anode fuel cell stack operating temperature.

The anode fuel cell or anode fuel cell stack operating temperature may be dependent on the temperature, composition, and relative flow rates of the primary and recirculated flows and/or on the temperature of the fuel cell or fuel cell stack coolant. When the anode gas is in a counter flow configuration to the coolant flow, the anode fuel cell or anode fuel cell stack operating temperature may be approximately equal to the coolant outlet temperature. In a co-flow configuration, the anode fuel cell or anode fuel cell stack operating temperature may be approximately equal to the coolant inlet temperature.

High anode gas inlet relative humidity levels may lead to flooding within the fuel cell 20 or fuel cell stack 12, which may induce local starvation and/or other effects that may reduce fuel cell 20 performance and/or damage the membrane electrode assembly (MEA) 22. In some embodiments, there may be a nominal or target anode gas inlet relative humidity range in which the fuel cell performance is improved and membrane electrode assembly (MEA) 22 degradation rate is minimized. For example, the fuel cell 20 or fuel cell stack 12 may achieve optimal performance when the anode inlet gas relative humidity levels is in the range of about 30% to about 35% at anode gas inlet conditions. In some embodiments, the anode gas inlet conditions may comprise an operating pressure of about 1.5 to 2.5 bara, and the anode fuel cell or anode fuel cell stack operating temperature at approximately the coolant outlet temperature.

Referring to FIG. 3, if the anode stream at the anode outlet 214 is saturated at the fuel cell operating temperature, and if the anode inlet stream relative humidity level is about 30%, a minimum excess fuel ratio ($\lambda_{H2}$) of about 1.37 to about 1.4 may be needed to maintain fuel cell performance and/or avoid damage to the membrane electrode assembly (MEA) 22. In other embodiments, if the anode stream at the anode outlet 214 is saturated at the fuel cell operating temperature, and if the relative humidity level is about 35%, a minimum excess fuel ratio ($\lambda_{H2}$) of about 1.45 to about 1.51 may be needed to maintain fuel cell performance and/or avoid damage to the membrane electrode assembly (MEA) 22.

Referring to FIG. 1C, coolant 36 flow in a fuel cell 20 or fuel cell stack 12 is provided to manage the heat generated within the fuel cell 20 or fuel cell stack 12 that may arise due to inefficiencies. Coolant 36 flow passages may be designed to enable effective heat transfer to remove any waste heat. A finite coolant heat capacity based on the coolant flow rate and coolant specific heat capacity may result in temperature variations across the fuel cell 20 or fuel cell stack 12. In some embodiments, design specifications may limit the allowable temperature rise across the fuel cell 20 or fuel cell stack 12. For example, at the beginning of life (BoL), a sufficiently high coolant flow rate may be required to limit the temperature rise to be about 5° C. to about 7° C. The inlet coolant temperature may be managed separately to meet an inlet temperature target.

As the fuel cell 20 or fuel cell stack 12 ages, the amount of heat generated within the fuel cell 20 or fuel cell stack 12 may increase. If the coolant 36 flow is maintained at the levels that meet the design specifications of the beginning of life (BoL) temperature rise, the temperature rise after aging may be more than about 5° C. to about 7° C.

As the fuel cells 20 or fuel cell 12 stacks are designed with effective heat transfer, the local anode and cathode stream temperatures may be similar to the local coolant temperature. The anode outlet stream temperature may also affect the excess fuel ratio ($\lambda_{H2}$). The anode outlet stream temperature may be closer to the coolant inlet temperature, which may be different than the fuel cell operating temperature. Thus, the anode outlet stream temperature may be up to about 7° C. lower at the beginning of life (BoL) and may be about 10° C. lower at end of life (EoL).

The coolant 36 temperature variations across the fuel cell 20 or fuel cell stack 12 may influence the cathode and anode inlet and/or outlet stream temperatures depending on the fuel cell 20 or fuel cell stack 12 design. The fuel cell 20 or fuel cell stack 12 may be designed in many configurations with three flow streams—anode stream, cathode stream, coolant stream. For example, each of the flow streams through the fuel cell 20 or fuel cell stack 12 may have a single inlet and outlet. The flow streams may be oriented to co-flow, counter-flow, or cross-flow.

Geometric (space) constraints may preclude cross-flow, and require that two of the three streams be co-flow with the third being counter-flow. If the fuel cell 20 or fuel cell stack 12 is designed with the anode stream as counter-flow, then the cathode stream and coolant stream are co-flow. In this configuration, the anode stream outlet temperature may be close to the inlet coolant temperature, whereas the cathode inlet/outlet stream temperature may be close to the inlet/outlet coolant temperature.

Since the fuel cell 20 or fuel cell stack 12 temperature may be controlled to a target cathode outlet temperature by controlling the coolant inlet temperature, in the embodiment described above, the cathode outlet temperature may be near the coolant outlet temperature. The cathode outlet temperature may range from about 55° C. to about 65° C., from about 65° C. to about 85° C., or from about 85° C. to about 95° C., including any specific temperature or range comprised therein. The cathode inlet temperature may be lower than the outlet temperature by about 5° C. to about 7° C. at BoL, and by about 10° C. lower at EoL. In this same configuration, the temperature of the anode outlet stream may be near the cathode inlet temperature and may be lower than the target fuel cell temperature target by about 5° C. to about 7° C. at BoL, and by about 10° C. lower at EoL. In some embodiments, the temperature difference in any configuration during BoL may range from about 1° C. to about 3° C., 3° C. to about 5° C., 5° C. to about 7° C., 7° C. to about 10° C., 10° C. to about 12° C., or any specific temperature or range comprised therein. In other embodiments, the temperature difference in any configuration during EoL may range from about 5° C. to about 7° C., 7° C. to about 10° C., 10° C. to about 12° C., 12° C. to about 15° C., or any specific temperature or range comprised therein.

The fuel cell 20 or fuel cell stack 12 may be designed such that the anode stream co-flows with the coolant 36, and the anode outlet stream temperature may be higher than the anode inlet stream temperature.

The source of the excess fuel and water content in a fuel cell 20 may be from a secondary or recirculated flow 226. Composition of the secondary flow 226 in the fuel cell system 10 is dependent on the composition of anode outlet stream 225. In some embodiments, the anode outlet stream 225 may be saturated with water at a given anode outlet stream temperature and pressure. Thus, the variation in the composition of the secondary flow 226 may be taken into account when determining a required secondary flow 226 to meet the excess fuel or relative humidity targets of the anode inlet stream 222.

If the anode outlet stream 225 is saturated with water, the anode stream outlet temperature is about 10° C. lower than the target anode fuel cell or anode fuel cell stack operating temperature, and if the target relative humidity level is about 30%, a minimum excess fuel ratio ($\lambda_{H2}$) of about 1.40 to about 1.49 may be needed to maintain fuel cell 20 performance and/or avoid damage to the membrane electrode assembly (MEA) 22. In other embodiments, if the anode gas outlet temperature is about 10° C. lower than the target temperature, and if the target relative humidity level is about 35%, a minimum excess fuel ratio (km) of about 1.50 to about 1.8 may be needed to maintain fuel cell 20 performance and/or avoid damage to the membrane electrode assembly (MEA) 22. The increase in the needed excess fuel ratio ($\lambda_{H2}$) may be more noticeable at high current densities where the change in temperature is larger.

The required flow rate of the secondary flow 226 can be set by either the need for excess fuel, or for increased water content, whichever calls for higher of the secondary flow 226. The required flow of the secondary flow 226 can be expressed as the target entrainment ratio (ER). The entrainment ratio (ER) is defined as the ratio of mass flow rate of the low pressure stream (e.g., the secondary mass flow rate) to the mass flow rate of the high pressure stream (e.g., the primary mass flow rate). Alternatively, a target effective excess fuel ratio or a minimum required fuel ratio may account for either the need for excess fuel, or for the increased water content of the anode inlet stream 222. 'Excess fuel ratio' may be used to represent the required composition derived from the secondary flow 226 to meet the anode inlet stream requirement 222. The anode inlet stream 222 requirement may be the more stringent of excess fuel ratio or relative humidity requirements of the fuel cell system 10.

Excess fuel ratio ($\lambda_{H2}$) or the anode stoichiometry ratio is defined as the ratio of anode inlet stream 222 flow rate to the fuel consumed in the fuel cell 20 or fuel cell stack 12. Excess fuel ratio ($\lambda_{H2}$) may be used to represent the required composition of the secondary flow 226 to meet the required anode inlet stream 222 characteristics. The required anode inlet stream 222 characteristics may be the more stringent of excess fuel ratio or relative humidity requirements of the fuel cell system 10. Minimum required excess fuel ratio ($\lambda_{H2}$) 140 as a function of current density 108 is shown in FIG. 2. In some embodiments, the fuel cell system 10 requires a fuel amount at or above the minimum required excess fuel ratio ($\lambda_{H2}$) 140.

In other embodiments, the fuel cell system 10 may require a target water or humidity level, which may affect the excess fuel ratio ($\lambda_{H2}$) 140. The excess fuel ratio ($\lambda$) 140 may be flat across the fuel cell system 10 operating range except at low current densities 108, such as at a current density 108 at or below an excess fuel ratio current density threshold ($i_{\lambda\_THV}$) 150. Alternatively, or additionally, the excess fuel ratio ($\lambda$) 140 may change with a change in current density 108.

In some embodiments, the excess fuel ratio ($\lambda_{H2}$) 140 above the excess fuel ratio current density threshold ($i_{\lambda\_THV}$) 150 may be in the range from about 1.3 to about 1.9, including any ratio comprised therein. In one preferable embodiment, the excess fuel ratio ($\lambda_{H2}$) 140 above the excess fuel ratio current density threshold ($i_{\lambda\_THV}$) 150 may be in the range of about 1.4 to about 1.6, including any ratio or range of ratio comprised therein.

In some embodiments, the excess fuel ratio current density threshold ($i_{\lambda\_THV}$) 150 of the fuel cell system 10 may be at or about 0.2 A/cm². In other embodiments, the excess fuel ratio current density threshold ($i_{\lambda\_THV}$) 150 may be at a different current density 108. For example, the excess fuel ratio current density threshold ($i_{\lambda\_THV}$) 150 may be at a current density 108 in the range of about 0.05 A/cm² to about 0.4 A/cm², including any current density 108 or range of current density 108 comprised therein. In one preferable embodiment, the excess fuel ratio current density threshold ($i_{\lambda\_THV}$) 150 may be about 0.1 A/cm² or about 0.2 A/cm². The excess fuel ratio current density threshold ($i_{\lambda\_THV}$) 150 may depend on the operating conditions of the fuel cell 20 or fuel cell stack 12.

In one embodiment, if the fuel cell 20 or fuel cell stack 12 is operating below the excess fuel ratio current density threshold ($i_{\lambda\_THV}$) 150, a minimum volumetric flow rate may be maintained through the anode 204 to flush out any liquid water that might form in the fuel cell 20 or fuel cell stack 12. At low flow rates (e.g., below about 0.2 A/cm² or below about 0.1 A/cm²), there may be flooding in the fuel cell 20 or fuel cell stack 12. If the minimum volumetric flow rate is below the excess fuel ratio current density threshold ($i_{\lambda\_THV}$) 150, the rate of fuel cell 20 or fuel cell stack 12 degradation may increase and the performance of the fuel cell or fuel cell stack may be adversely affected.

The venturi or an ejector 230 may be used in the fuel cell system 10. The venturi or ejector 230 may be sized, such that the fuel cell system 10 may not require the assistance of a recirculation pump 220, such as a blower, at certain current densities 108. Absence of usage of the recirculation pump or blower 220 may result in a decrease in parasitic load, as shown by the curves 170 and 180 of FIG. 2. The curve 170 shows a fraction of flow that is delivered by the recirculation pump or blower 220 in the absence of a venturi or ejector 230. The curve 180 shows the corresponding parasitic load.

The parasitic load may increase with an increase in current density, as shown by the curve 180. This recirculation pump or blower 220 may function at a capacity proportional to pressure loss in the fuel cell 20 or fuel cell stack 12 and/or proportional to the required flow rate of the secondary flow 226 in the fuel cell 20 or fuel cell stack 12. The fuel cell 20 or fuel cell stack 12 may be initially operating at high current density 138 and/or at high operating temperatures and pressures, such that the fuel cell load under this initial operating condition is high. The fuel cell load is defined as:

Load=stack power=current×fuel cell or fuel cell stack voltage=current density×fuel cell area× fuel cell or fuel cell stack voltage.

The fuel cell 20 or fuel cell stack 12 may be in a load shedding state when the load demand for power is rapidly reduced or shed requiring the fuel cell 20 or fuel cell stack 12 to reduce the current delivered During transient operations in the fuel cell 20 or fuel cell stack 12, the operating pressure in the fuel cell 20 or fuel cell stack 12 may change based on the changes in the fuel cell 20 or fuel cell stack 12 operating temperature. For example, during load shedding, the fuel cell system 10 may have an operating pressure that corresponds to a transient operating pressure ($P_{\_AIM\_TRS}$) that may be greater than its steady state operating pressure ($P_{\_AIM\_SS}$). In some embodiments, the transient operating pressure ($P_{\_AIM\_TRS}$) may equal the highest anode inlet manifold pressure ($P_{AIM\_HI}$) 110 even at low current densities 108.

During load acceptance, the rate of increase in current density 108 is limited, and the steady state operating pressure ($P_{\_AIM\_SS}$) may equal the anode inlet manifold pressure ($P_{AIM}$). Alternatively, or additionally, during load acceptance, the fuel cell 20 or fuel cell stack 12 operating temperature may overshoot the target operating temperature due to imperfect temperature control via coolant thermostatic controls. The operating pressure under such conditions is higher than the operating pressure under nominal (steady state) operation. This situation is similar to that which occurs during rapid load shedding.

In one embodiment, the operating pressure of fuel cell 20 or fuel cell stack 12 indicated by the curve 160 may optimize the balance between enabling efficient fuel cell 20 or fuel cell stack 12 operation and the parasitic load required to operate at the chosen operating pressure (e.g., the parasitic load of an air compressor, a blower, and/or a pump). In some embodiments, the operating temperature indicated by the curve 106, operating pressure indicated by the curve 160, and/or excess air ratio may maintain a target relative humidity (RH) for the fuel cell 20 or fuel cell stack 12 operation. The operating temperature indicated by the curve 106, operating pressure indicated by the curve 160, and/or excess air ratio may be determined by targeting a specific value for the relative humidity (RH) at the cathode 208.

The excess air ratio is defined similarly to excess fuel ratio ($\lambda_{H2}$) 140, but refers to the cathode 208 side flow (i.e., excess $O_2$ in the air). The combination of excess air ratio, pressure and temperature may be used together to control humidity on the cathode 208 side. The humidity on the cathode 208 side may in turn impacts water content on the anode ($H_2$) side. In one embodiment, temperature, pressure, and excess air ratio that vary with current density may be used to control humidity. In some embodiments, excess air ratio may be about 2.0.

In other embodiments, excess air ratio may be in the range of about 1.7 to about 2.1, including any ratio or range of ratio comprised therein. In some other embodiments, excess air ratio may be in the range of about 1.8 to about 1.9, including any ratio or range of ratio comprised therein, under pressurized operation. Excess air ratio may increase to below an air threshold current to keep volumetric flow rate high enough to prevent flooding in the fuel cell 20 or fuel cell stack 12 on the cathode 208 side.

The target relative humidity (RH) may be maintained by using a humidification device in combination with the operating pressure and operating temperature. For example, a humidification device may be used on the cathode 208 side of the fuel cell 20 or fuel cell stack 12. If the target relative humidity (RH) and the target operating pressure of the fuel cell 20 or fuel cell stack 12 are specified, the target temperature for the fuel cell 20 or fuel cell stack 12 operation may be determined.

Referring to FIG. 3, the mechanical regulator 250 is a control valve 256 that may be used to control the flow of fresh fuel 202 also referred to as primary flow, primary mass flow, primary fuel, or motive flow to the anode 204. The control valve 256 may be a proportional control valve, or an injector instead of the mechanical regulator 250 (e.g., a dome regulated mechanical regulator). The control valve 256 may comprise an inner valve 258, coil 255, or solenoid 257 that controls the opening or closing of the control valve 256.

Pressure differential between the gas streams (e.g. anode inlet stream 222 and air 206) at the anode 204 and the cathode 208 may provide an input signal 254 to a controller 252 in the mechanical regulator 250. The controller 252 of the mechanical regulator 250 may determine the flow of the anode inlet stream 222 through an anode inlet 212 at the anode 204. The control valve 256 may be a proportional control valve, or an injector. In other embodiments, the control valve 256 may comprise an inner valve 258, coil 255, or solenoid 257 that controls the opening or closing of the control valve 256. The input signal 254 from the anode 204 and/or cathode 208 of the fuel cell 20 or fuel cell stack 12 may be a physical signal or a virtual (e.g., an electronic) signal. The input signal 254 may be any type of communicative or computer signal known in the art.

Flow rate of the primary flow 202, or a primary flow rate, may be controlled to match the fuel consumption in the fuel cell stack 12 based on the operating pressure (e.g., anode pressure). In some embodiments, the pressure in the anode 204 may stabilize when fuel consumption matches the fresh fuel feed at the anode 204 assuming that all other parameters are equal. Since the functioning of the mechanical regulator 250 is based on the pressure differential between the anode 204 and cathode 208, a target pressure differential needs to be maintained when using the mechanical regulator 250. In some embodiments, pressure at the cathode 208 is controlled and/or maintained at a target level via cathode side controls 282.

A mechanically regulated approach, such as by employing actuators 282, may use pressure signals 281 from a cathode/air inlet 216 to control mass flow and maintain an appropriate pressure on the cathode 208 side of the fuel cell stack 12. In some embodiments, pressure signals 218 from cathode 208 side are inputs to the mechanical regulator 250. In some embodiments, the anode 204 side mass flow and anode 204 side pressure may be controlled by using the pressure signals 281 from cathode 208 side and measuring one or more anode 204 side conditions.

A mechanically regulated approach, such as by employing actuators 282, may use pressure signals 281 from a cathode/air inlet 216 to control mass flow and maintain an appropriate pressure on the cathode 208 side of the fuel cell stack 12. In some embodiments, pressure signals 218 from cathode 208 side are inputs to the mechanical regulator 250. In some embodiments, the anode 204 side mass flow and anode 204 side pressure may be controlled by using the pressure signals 281 from cathode 208 side and measuring one or more anode 204 side conditions.

A single point pressure at the anode 204 may be calculated to be the cathode 208 side pressure plus the pressure differential between the gas streams (e.g., 222) at the anode 204 and the gas streams (e.g., 206) at the cathode 208. Single point pressure may be absolute pressure or gauge pressure.

The venturi or ejector 230 may draw the secondary flow 226, also referred to as secondary mass flow, entrainment flow, or recirculation flow, using a flow pressure across an anode gas recirculation (AGR) loop 224. As discussed later, the venturi or ejector 230 may take advantage of the available excess enthalpy from the higher pressure primary flow to draw in the secondary flow 226, working against the pressure losses through the AGR loop 224. The anode gas recirculation loop 224 may include the venturi or ejector 230, the fuel cell stack 12, and a secondary inlet 232, such as one comprised in a suction chamber 620 in the venturi or ejector 230, and/or other piping, valves, channels, manifolds associated with the venturi or ejector 230 and/or fuel cell stack 12. The recirculation pump or blower 220 may increase or decrease the differential pressure across the AGR loop 224.

The fuel cell system 10 may require a target water or humidity level, which may drive the flow of saturated secondary flow 226. The saturated secondary flow 226 may then drive the primary flow 202, such that the target excess fuel ratio ($\lambda_{H2}$) 140 may be dependent on the target water or humidity level.

In one embodiment, the recirculation pump or blower 220 may be used to achieve the excess fuel ratio ($\lambda_{H2}$). The recirculation pump or blower 220 may operate across the entire operating range (current density) of the fuel cell stack 12. The parasitic load of the recirculation pump or blower 220 may be substantial. In one embodiment, a large recirculation pump or blower 220 may be required to provide the power to achieve the target excess fuel ratio ($\lambda_{H2}$) 140. In some embodiments the use of the recirculation pump or blower 220 may be inefficient and expensive. The operating characteristics of a recirculation pump or blower 220 may be distinct from the operating conditions of the venturi or ejector 230.

A pressure lift capability of the recirculation pump or blower 220 ($\Delta P_{\_BLWR}$) is a function of the flow through the recirculation pump or blower 220 (Q), the blower speed (N), and the density of the flow composition ($\rho$). The pressure lift of the recirculation pump or blower 220 ($\Delta P_{\_BLWR}$) may be limited by power draw limits and/or speed limit of the fuel cell system 10. When the recirculation pump or blower 220 is not spinning or is operating under other fuel cell system 10 stall conditions, the recirculation pump or blower 220 may act as a restriction in the AGR loop 224.

$$\Delta P_{\_BLWR} = f(Q, N, \rho) \quad (1)$$

The fuel cell system 10 may operate under varying operating conditions. Operating conditions may include, but are not limited to operating current density, operating pressure, operating temperature, operating relative humidity, fuel supply pressure, fuel supply temperature, required recirculation flow, entrainment ratio, parasitic load limitations, power needs, pressure loses in the AGR loop 224, venturi or ejector 230 performance and/or efficiency, recirculation pump or blower 220 performance and/or efficiency, fuel density, purge flow, and choked or unchoked (e.g., not choked) flow conditions.

The turn down ratio of the fuel cell system 10 is defined as the ratio of the maximum capacity of the venturi or ejector 230 to the minimum capacity of the venturi or ejector 230. The venturi or ejector 230 may draw the recirculation flow 226 using a primary flow exergy. The turn down ratio characterizes the range over which the venturi or ejector 230 can deliver the required excess fuel ratio ($\lambda_{H2}$) 140 to the fuel cell stack 12. The fuel cell system 10 may be designed to maximize the venturi or ejector 230 turn down ratio. Consequently, maximizing the turn down ratio of the venturi or ejector 230 also works to minimize the size and parasitic load associated with the recirculation pump or blower 220. In some embodiments, the venturi or ejector 230 may be required to operate and/or perform robustly to deliver the required primary flow 202 at the required excess fuel ratio ($\lambda_{H2}$) 140.

In one embodiment, a fuel supply system 80 may supply fuel at a fuel supply pressure ($P_{CV}$) and a fuel supply temperature ($T_{CV}$). The primary flow 202 may pass through the control valve 256 and enter the venturi or ejector 230 through a primary nozzle 231 at a primary nozzle inlet pressure ($P_O$) and a primary inlet temperature ($T_O$). The secondary flow 226 may enter the venturi or ejector 230 through a secondary inlet or entrance 232 in a suction chamber 620 at a secondary inlet pressure ($P_S$) and a secondary inlet temperature ($T_S$).

Sizing pressure ($P_{\_CV\_MIN}$) may be a minimum inlet pressure at a control valve 256 such as the proportional control valve or mechanical regulator 250 or injector. In other embodiments, fuel sizing pressure ($P_{\_CV\_MIN}$) may be the pressure at the inlet of a control valve 256 under empty pressure conditions ($P_{EMPTY}$). The secondary flow 226 may enter the venturi or ejector 230 through a secondary inlet 232 in a suction chamber 620 at a secondary inlet pressure ($P_S$) and a secondary inlet temperature ($T_S$).

The venturi or ejector 230 may have exergy available in primary flow to induce the anode gas recirculated flow as the secondary flow 226 in the venturi or ejector 230. The stack pressure ($\Delta P_{STACK}$) is the pressure loss through the AGR loop 224. The secondary flow 226 may be lifted against the stack pressure ($\Delta P_{STACK}$).

The pressure lift ($\Delta P_{LIFT}$) is the pressure required to overcome the pressure loses in the AGR loop 224 ($\Delta P_{STACK}$). In some embodiments, the pressure lift ($\Delta P_{LIFT}$) may be dominated by the pressure losses through the fuel cell stack 12 or any other component of the AGR loop 224. In some embodiments, pressure losses may be proportional to volumetric flow rate through one or more manifolds and/or channels in the AGR loop 224. In other embodiments, the volumetric flow 222 at anode inlet 212 may include a mixture of fresh fuel (e.g., $H_2$) as the primary flow 202 and the recirculation flow 226.

The secondary inlet pressure ($P_S$) may depend on the anode inlet manifold pressure ($P_{AIM}$) of the fuel cell or fuel cell stack 12 and the pressure loses in the AGR loop 224 ($\Delta P_{STACK}$) or the required pressure lift ($\Delta P_{LIFT}$).

$$P_S = P_{AIM} - \Delta P_{LIFT} \quad (2)$$

The amount of secondary flow 226 that can be entrained is dictated by the boundary conditions of the fuel cell system 10 and the efficiency of the venturi or ejector 230. In some embodiments, the boundary conditions may be the primary nozzle inlet pressure ($P_O$), the secondary inlet pressure ($P_S$), the anode inlet manifold pressure ($P_{AIM}$) of the fuel cell or fuel cell stack 12, and/or secondary flow 226 composition. In some embodiments, the secondary flow 226 from the anode outlet 214 to the venturi or ejector secondary inlet 232 is an adiabatic process. The primary inlet temperature ($T_O$) and the secondary inlet temperature ($T_S$) of the venturi or ejector 230 may affect secondary flow 226.

As described earlier, above a certain critical current density ($i_{LO\_CR}$) 130, the fuel cell system 10 is required to operate in the target anode inlet manifold pressure range indicated by the curve 160 in FIG. 2. The primary inlet pressure ($P_O$) may decrease proportionally with primary fuel demand, until the primary nozzle 231 is no longer choked (i.e., unchoked). In other embodiments, if the primary nozzle 231 is unchoked, the rate of decrease of the primary inlet pressure ($P_O$) may be non-linear and/or may be sensitive to downstream pressure such as the secondary inlet pressure ($P_S$). In other embodiments, the primary inlet pressure ($P_O$) may decrease as the primary inlet temperature ($T_O$) decreases.

The primary inlet temperature ($T_O$) may be equal to the fuel supply temperature ($T_{CV}$). The primary inlet temperature ($T_O$) may affect the primary flow 202. In some embodiments, the fuel cell system 10 may have a target mass flow rate. In other embodiments, the secondary inlet temperature ($T_S$) may influence the secondary flow 226 through geometric constraints of the secondary inlet 232 and/or the venturi or ejector 230. In some embodiments, the secondary inlet temperature ($T_S$) may be a geometric constraint. The thermodynamic constraints and/or venturi or ejector 230 efficiency may also influence the secondary flow 226.

The venturi or ejector 230 may be sensitive to the primary nozzle inlet pressure ($P_O$), the backpressure, and the required pressure lift ($\Delta P_{LIFT}$). The backpressure may be an exit pressure at an ejector outlet or exit 238 ($P_C$) or may be the anode inlet manifold pressure ($P_{AIM}$). If there are no pressure losses to the anode inlet manifold from the venturi or ejector 230 outlet, the exit pressure at the ejector exit 238 ($P_C$) may be equal to the anode inlet manifold pressure ($P_{AIM}$). In some embodiment, the primary nozzle inlet pressure ($P_O$) may be a function of the current density (i) in the fuel cell system 10.

$$P_O = f(i) \quad (3)$$

Entrainment ratio (ER), which is a measure of the performance and/or capability of the venturi or ejector 230 and may be sensitive to the primary nozzle inlet pressure ($P_O$), the backpressure (e.g., $P_C$, $P_{AIM}$) and/or the pressure lift ($\Delta P_{LIFT}$). In one embodiment, as backpressure (e.g., $P_C$, $P_{AIM}$) increases, the venturi or ejector 230 may change from being double choked (with a stable entrainment ratio), to being in a transitioning condition (with a decreasing entrainment ratio), to having a reverse flow. Reverse flow in the venturi or ejector 230 may be undesirable as reverse flow indicates no fuel recirculation through the AGR loop 224. In some embodiments, the venturi or ejector 230 may need to offset pressure losses through the fuel cell or fuel cell stack 12 ($\Delta P_{STACK}$), while operating against the backpressure (e.g., $P_C$, $P_{AIM}$).

Methods or systems that enable the fuel management system to directly measure the excess fuel ratio ($\lambda_{H2}$) in the fuel cell system 10 are useful to the performance of the fuel cell system 10. While the direct measurement of the recirculation flow rate, primary flow rate, or entrainment ratio may not be possible, the fuel (e.g., $H_2$) consumption in the fuel cell system 10 and/or any purge gas flow rate in the fuel cell system 10 may be determined. In some embodiments, the fuel consumption may be based on the operating current density.

A key function of the fuel management system may be to provide an anode gas flow rate with an excess fuel ratio ($\lambda_{H2}$) that is above a minimum value. The excess fuel ratio ($\lambda_{H2}$) may depend on the flow rate of the primary flow stream 202, the flow rate of the recirculation flow stream 226, and/or the composition of the recirculation flow stream 226. The recirculation flow stream 226 may comprise fuel (e.g., $H_2$) and water. Alternatively, or additionally, the recirculation flow stream 226 may comprise other gases such as nitrogen ($N_2$). The excess fuel ratio ($\lambda_{H2}$) is calculated as:

$$\lambda_{H2} = [(1 - x_{\_H2O\_RC} - x_{\_N2\_RC}) m_{\_RC} + m_{\_H2\_P}] / [m_{\_H2\_P}] \quad (4)$$

$x_{\_H2O\_RC}$ is the mass fraction of water in the recirculation flow, $x_{\_N2\_RC}$ is the mass fraction of nitrogen in the recirculation flow, $m_{\_RC}$ is the mass flow rate of the recirculation flow, $m_{\_H2\_P}$ is the mass flow rate of fuel in the primary flow stream 202.

In one embodiment, the relative flow rates of the recirculation flow stream 226 and the primary flow stream 202 may be considered to determine the entrainment ratio.

$$ER = [\lambda_{H2} - 1] / [(1 - x_{\_H2O\_RC} - x_{\_N2\_RC})] \quad (5)$$

$$ER = m_{\_RC} / m_{\_H2\_P} \quad (6)$$

Figure 4:
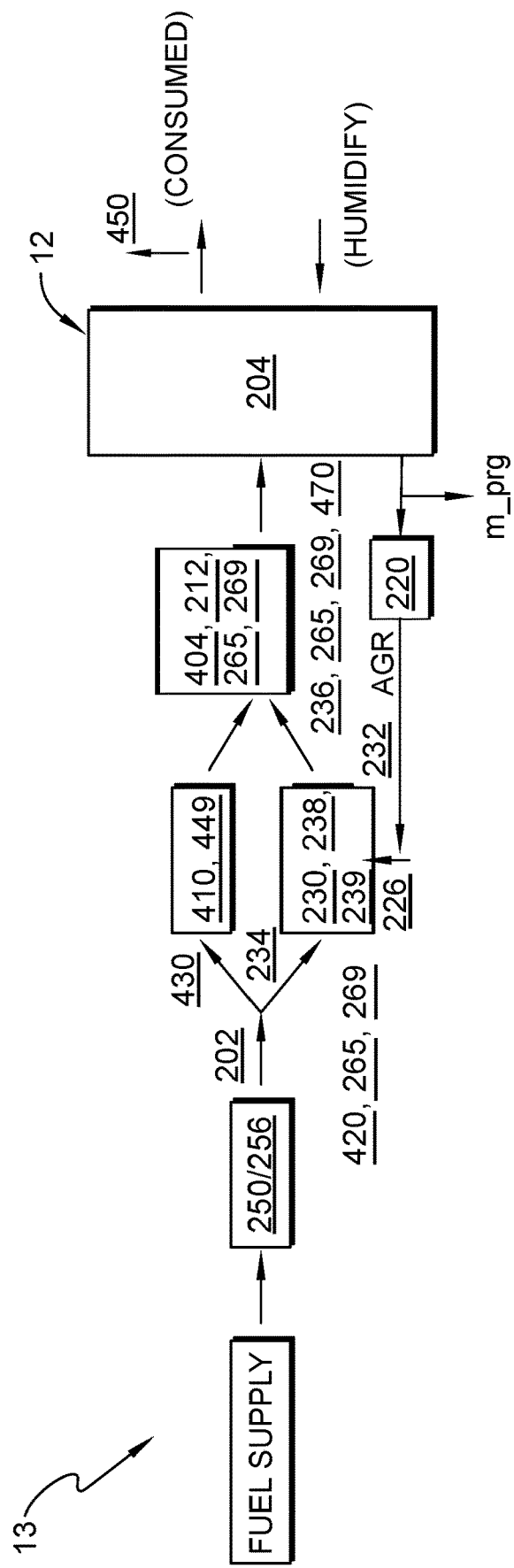
FIG. 4 is a schematic showing a flow restriction used along with a venturi or ejector in a fuel cell stack system.

A fuel cell system 13 may be in a configuration as illustrated in FIG. 4. The venturi or ejector 230, sized to support a fraction of primary flow stream 202 (e.g., $H_2$), may be placed in parallel with a by-pass valve or flow restriction 410. At a minimum, the by-pass valve or flow restriction 410 needs open/close functionality, and must be sized to provide remainder of primary flow stream 202 that does not flow through the venturi or ejector 230. The by-pass valve or flow restriction 410 may be a binary valve with open/close functionality. Alternatively, the by-pass valve or flow restriction 410 may have a variable opening or closing inner valve.

The by-pass valve or flow restriction 410 may be a mechanical regulator, a dome loaded mechanical regulator, an injector, or a proportional control valve. A configuration comprising a by-pass valve or flow restriction 410 may enable anode gas recirculation (AGR) requirements to be met across the entire operating range (from when the fuel cell system 13 is in idle state to when the fuel cell system 13 is functioning in the state of maximum current density).

A configuration comprising a by-pass valve or flow restriction 410 (e.g., a proportional control valve) and an adequately sized venturi or ejector 230 may enable anode gas recirculation (AGR) requirements to be met across the entire operating range (from when the fuel cell system 13 is in idle state to when the fuel cell system 13 is functioning in the state of maximum current density) without requiring a recirculation pump or blower 220. Such a configuration is referred to as the EES (elegant ejector system) configuration.

As shown in FIG. 4, fresh fuel 202 may enter a control valve 256 such as a mechanical regulator 250 at a fuel supply temperature ($T_{CV}$) and fuel supply pressure ($P_{CV}$). The fresh fuel 202 may exit the mechanical regulator 250 and enter the venturi or ejector 230 or flow restriction 410 at a primary nozzle inlet pressure ($P_O$) and primary inlet temperature ($T_O$). A certain amount of the fresh fuel 202 exiting the control valve 256 may enter the venturi or ejector 230 ($m_{\_H2\_EP}$, 420) at the entrance 234. A certain amount of the fresh fuel 202 exiting the control valve 256 may enter the by-pass valve or flow restriction 410 ($m_{\_H2\_RP}$, 430). The anode gas recirculation composition 226 ($m_{RC}$) may enter the venturi or ejector 230 at the entrance 232 at a secondary inlet pressure ($P_S$) and secondary inlet temperature ($T_S$). The anode gas recirculation composition 226 ($m_{\_RC}$) may have water with a mass fraction $x_{\_H2O\_RC}$. The fuel may enter the anode 204 of the fuel cell stack 12 at the anode inlet manifold 304.

In the illustrated embodiment, there may be two entrainment ratios to consider, the entrainment ratio of the venturi or ejector 230 ($ER_{\_EES}$) and the entrainment ratio of the system (ER):

$$ER_{\_EES} = m_{\_RC}/m_{\_H2\_EP} \qquad (7)$$

$$ER = m_{\_RC}/m_{\_H2\_P} \qquad (8)$$

The by-pass valve or flow restriction 410 may be operated to achieve the excess fuel ratio ($\lambda_{H2}$). The by-pass valve or flow restriction 410 may be completely open, completely closed, or may be opened but not completely opened. The opening of the by-pass valve or flow restriction 410 may depend on the excess fuel ratio (km) or the entrainment ratio of the system (ER) or the entrainment ratio of the venturi or ejector 230 ($ER_{\_EES}$).

In one embodiment, the fuel cell system 10/13 may not comprise a venturi or an ejector 230. In some embodiments, the fuel cell system 10/13 may comprise a mixing manifold instead of venturi or an ejector 230. The primary flow stream 202/420 and the recirculation flow stream 226 may mix in the mixing manifold to form the flow stream 222.

The fuel cell system 10/13 may comprise more than one venturi or ejector 230 in a parallel or series configuration. The operation of the more than one venturi or ejector 230 in a parallel or series configuration may be determined based on the entrainment ratio of the system (ER) or the entrainment ratio of the venturi or ejector 230 ($ER_{\_EES}$). Determining the operation of the more than one venturi or ejector 230 in a parallel or series configuration may comprise determining if all or some of the venturi or ejector 230 in a parallel or series configuration are required to operate, and/or determining the order of the operation of the more than one venturi or ejector 230 in a parallel or series configuration.

The excess fuel ratio ($\lambda_{H2}$) or the entrainment ratio of the system (ER) or the entrainment ratio of the venturi or ejector 230 ($ER_{\_EES}$) may be determined by using physical or virtual sensing systems or methods. In some embodiments, one or more controller 239 may be used for monitoring and/or controlling the physical or virtual temperature sensors 262, pressure sensors 263, humidity or moisture or water sensors 265, or sound sensors 269.

In the fuel cell system 10/13, in order to determine when the recirculation pump or blower 220 needs to be used to provide additional support to the venturi or ejector 230, the entrainment ratios (ER, $ER_{\_EES}$) need to be accurately estimated. If the entrainment ratio is estimated, use of the recirculation pump or blower 220 may be initiated when the fuel cell system 10/13 approaches the operating condition where the venturi or ejector 230 is expected to be near its operational limit. The use of the recirculation pump or blower 220 may be initiated when the operating current density is less than about 0.8 A/cm² and/or at the temperatures or pressures associated with a current density less than about 0.8 A/cm².

If the fuel cell system 10/13 is operating under transient conditions, the operating current density for initiating use of the recirculation pump or blower 220 may be different than if the fuel cell system 10/13 is operating at steady state conditions. For example, if the fuel cell system 10/13 is operating at about 0.8 A/cm² under transient conditions, the system may temporarily operate at about 1.5 bara pressure instead of about 2.5 bara pressure and at about 75° C. instead of about 85° C. If the recirculation pump or blower 220 may need to be turned on at about 0.8 A/cm² under steady state conditions, the recirculation pump or blower 220 may need to be initiated at about 1 A/cm² if the fuel cell system 10/13 is operating under transient conditions.

The excess fuel ratio ($\lambda_{H2}$) may be estimated and used as feedback to blower controls 229 when the fuel cell system 10/13 is engaging the recirculation pump or blower 220, so that the parasitic load associated with running the recirculation pump or blower 220 may be minimized. The excess fuel ratio ($\lambda_{H2}$) may be estimated and used as feedback to a blower controller when the system is engaging the recirculation pump or blower 220, so that the speed of the recirculation pump or blower 220 may be altered. The excess fuel ratio ($\lambda_{H2}$) may be estimated and used as feedback to a by-pass valve controller 449 or to an ejector controller 239.

In one embodiment, use of physical or virtual sensing systems or methods may result in uncertainty in the measured entrainment ratio (ER). In some embodiments, the physical or virtual sensing systems or methods may comprise temperature sensors 262, pressure sensors 263, humidity sensors 265, and/or sound sensors 269. To protect for uncertainty in the measured entrainment ratio (ER), the concept of a nominal entrainment ratio ($ER_{NOM}$) and minimum entrainment ratio ($ER_{MIN}$) may be used.

$$ER_{NOM} = ER_{MIN} + Z\sigma_{\_ER} \qquad (9)$$

Z gives a statistical level of confidence that the excess fuel ratio ($\lambda_{H2}$) will be above the minimum required excess fuel ratio ($\lambda_{H2}$) or at target excess fuel ratio ($\lambda_{H2}$) a when the nominal entrainment ratio ($ER_{NOM}$) is measured for given population standard deviation of $\sigma_{\_ER}$. If the entrainment ratio (ER) measured is equal to the nominal entrainment ratio ($ER_{NOM}$), the recirculation pump or blower 220 may need to be used to provide additional support to the venturi or ejector 230. If Z is equal to about 2.05, there would 98% confidence that the excess fuel ratio ($\lambda_{H2}$) will be above the minimum required excess fuel ratio ($\lambda_{H2}$). The systems and methods used to measure the nominal entrainment ratio ($ER_{NOM}$) and excess fuel ratio ($\lambda_{H2}$) may need to have uncertainty of less than about 12%. The ratio of the standard deviation ($\sigma_{\_ER}$) to and minimum entrainment ratio ($ER_{MIN}$) is less than about 12%.

$$\sigma_{\_ER}/ER_{MIN} \le 12\% \quad (10)$$

In one embodiment, humidity based methods may be used to estimate the entrainment ratio (ER) in the fuel cell system 13 and to determine if the recirculation pump or blower 220 needs to operate and/or the nominal speed of the recirculation pump or blower 220. The excess fuel ratio ($\lambda_{H2}$) may be indirectly determined by physical or virtual humidity sensors 265 used to measure water content or humidity in the flow stream 236 that enters the anode inlet manifold 404 or anode inlet 212 of fuel cell 20 or fuel cell stack 12. The method of using humidity or water content measurement to determine the excess fuel ratio ($\lambda_{H2}$) may take advantage of having a dry fuel (e.g., $H_2$) as a reference stream. The humidity measurements may be recalibrated against the dry fuel stream. A saturated fuel stream may be used as reference stream.

A thermal conductivity detector (TCD) 770 may be used to measure the relative humidity of the flow stream 236 entering the anode inlet manifold 404 or anode inlet 212 of the fuel cell 20 or fuel cell stack 12 using the humidity at a different location in the in the system 10 as a reference point. The thermal conductivity detector (TCD) 470 may determine the humidity difference between dry fuel (e.g., $H_2$) in the primary flow stream 202/420 and the flow stream 236 entering the anode inlet manifold 404 or anode inlet 212 of the fuel cell 20 or fuel cell stack 12. The humidity difference between a reference gas and the flow streams 202, 420, 226, 236 may be determined. The humidity difference between a reference gas and the flow streams may be determined upstream and/or downstream of the venturi or ejector 230 or upstream and/or downstream of when the primary flow stream 202/420 mixes with the recirculation flow stream 226. In other embodiments, a four way valve may be used on two flow paths. For example, an upstream flow stream may be sent downstream and a downstream flow may be sent upstream.

More than one humidity sensor 265 may be used to measure humidity at more than one locations in the fuel cell system 10/13. In some embodiments, one or more humidity sensors 265 may be used upstream and/or downstream of the venturi or ejector 230 or upstream and/or downstream of where the primary flow stream 202/420 mixes with the recirculation flow stream 226. Such a sensing technology may be robust and low cost.

The water content of the flow stream 236 entering the anode inlet manifold 404 or anode inlet 212 of the fuel cell 20 or fuel cell stack 12 in the fuel cell system 10/13 may be characterized by a sensor 265 that measures relative humidity, absolute humidity, enthalpy, dew point temperature, water vapor pressure, water mixing ratio, wet bulb temperature, and/or water mass fraction. In some embodiments, the sensor 265 may be measuring relative humidity, absolute humidity, enthalpy, dew point temperature, water vapor pressure, water mixing ratio, wet bulb temperature, and/or water mass fraction based on the respective measurements of these variables at a different location in the fuel cell system 10/13.

The pressure at the location where the sensor 265 is placed in the fuel cell system 10/13 may need to be determined. If the sensor 265 is directly placed in the flow stream 236 entering the anode inlet manifold 404 or anode inlet 212 of the fuel cell 20 or fuel cell stack 12, the anode inlet manifold pressure ($P_{AIM}$) may need to be determined. The sensor 265 may be placed in the anode exhaust stream 450. The anode exhaust stream may be a small portion of the flow stream 236 entering the anode inlet manifold 404 or anode inlet 212 of the fuel cell 20 or fuel cell stack 12 that is directed to the cathode exhaust stream. In some embodiments, the anode exhaust stream 450 may be directed to the cathode exhaust stream if the exhaust pressure is known. The composition of the anode exhaust stream 450 may be different or the same as the purge composition. In other embodiments, a purge line may be set up to collect water, so that when a valve in the purge line opens, mostly liquid water is drained first. After the accumulated water is purged, then the purge composition may be the same as the anode exhaust stream 450.

Sensors 265 used in the fuel cell system 10/13 may use capacitive or optical (e.g., chilled mirror) technologies. Optical sensors may have high accuracy when used to measure water content. Use of optical sensors may be challenging due to cost, size, and robustness during operation. In other embodiments, capacitive or impedance sensors may be preferred for fuel cell applications. These sensors 265 may be based on measuring water adsorption on ceramics with oxide coating. In some embodiments, use of capacitive sensors may be challenging due to challenges in long term stability concerns.

The sensors 265 used in the fuel cell system 10/13 may tend to drift with time or usage. In some embodiments, the humidity sensing systems comprising the sensors 265 may be recalibrated on a regular basis. In some embodiments, the humidity sensing systems may be recalibrated periodically to correct for long term drift. The time between recalibrations is dependent on operating conditions, and can range from one days to many months. The time between recalibration may be 2 days to about 7 days, 7 days to about 14 days, 14 days to about 21 days, 21 days to about 30 days, 30 days to about 60 days, 60 days to about 90 days, 90 days to about 120 days, or more than 120 days, including any number of days comprised therein. Factors including but not limited to the anode fuel cell or anode fuel cell stack operating temperature may influence the time between calibrations. For example, the rate of drift could increase with the anode fuel cell or anode fuel cell stack operating temperature and the time between recalibrations may be shorter with higher temperature operation of the fuel cell 20 or fuel cell stack 12.

In one embodiment, the sensors 265 may need to have a response time less than about 1 second. In other embodiments, the sensors 265 may need to have a response time less than about 0.5 second. The sensors 265 may need to meet the hazard rating for fuel cell 20 or fuel cell stack 12 applications. For example, the sensors 265 may be required to be designed to operate safely in an environment that contains flammable hydrogen gas.

The humidity sensor 265 may be used for continuous monitoring of the fuel cell system 10/13. In some embodiments, the rate of change of water content in the recirculation flow stream 226 may be compared to the fuel consumption by the fuel cell 20 or fuel cell stack 12. The fuel cell system 10/13 may be perturbed and the change due to the perturbation may be assessed to determine if the fuel cell system 10/13 is providing sufficient input to the one or more humidity sensors 265. The perturbation may comprise pulsing the recirculation pump or blower 220 or pulsing the primary flow stream 202/420. In some other embodiments, laboratory grade analyzers such as algorithms and/or sensors capable of detecting minimal change in humidity such as about 1% or less may be used.

In one embodiment, the sensors 265 used in the fuel cell system 10/13 may need to meet certain minimum accuracy requirements. The sensor 265 determining the humidity in the flow stream 236 entering the anode inlet manifold 404 or anode inlet 212 of the fuel cell 20 or fuel cell stack 12 may give rise to system uncertainties that may need to be captured when defining nominal excess fuel ratio ($\lambda_{H2}$_NOM), nominal entrainment ratio ($ER_{NOM}$), nominal relative humidity, and/or nominal dew point.

The mass fraction of water in the recirculation flow stream 226 ($x_{\_H2O\_RC}$) and the mole fraction of water in the recirculation flow stream 226 ($y_{\_H2O\_RC}$), nominal excess fuel ratio (42 Nom), the molecular weight of the recirculation flow stream 226 ($MW_{\_RC}$), the molecular weight of water ($MW_{\_H2O}$), the molecular weight of fuel (e.g., $H_2$) ($MW_{\_H2}$), may be used to determine the nominal entrainment ratio ($ER_{NOM}$).

$$ER_{NOM} = [\lambda_{H2\_NOM} - 1]/[(1 - (y_{\_H2O\_RC} \times MW_{\_H2O}/MW_{\_RC})] \quad (11)$$

$$MW_{\_RC} = y_{\_H2O\_RC} \times MW_{\_H2O} + (1 - y_{\_H2O\_RC}) \times MW_{\_H2} \quad (12)$$

The mass flow rate of the recirculation flow stream 226 ($m_{\_RC}$) may be determined based on the mass flow rate of the primary flow stream 202/420 ($m_{\_H2\_P}$) and the nominal entrainment ratio ($ER_{NOM}$).

$$m_{\_RC} = m_{\_H2\_P}/ER_{NOM} \quad (13)$$

The mass flow rate of fuel in the recirculation flow stream 226 ($m_{\_H2\_RC}$) and the mass flow rate of the water in recirculation flow stream 226 ($m_{\_H2O\_RC}$) may be determined as shown below.

$$m_{\_H2\_RC} = m_{\_RC} \times (1 - x_{\_H2O\_RC}) \quad (14)$$

$$x_{\_H2O\_RC} = y_{\_H2O\_RC} \times MW_{\_H2O}/MW_{\_RC} \quad (15)$$

$$m_{\_H2O\_RC} = m_{\_RC} - m_{\_H2\_RC} \quad (16)$$

In one embodiment, the nominal mole fraction of the water flow stream 236 entering the anode inlet manifold 404 or anode inlet 212 of the fuel cell 20 or fuel cell stack 12 ($y_{\_H2O\_AIM\_NOM}$) in the fuel cell system 10/13 is the target mole fraction of the water flow stream 236 entering the anode inlet manifold 404 or anode inlet 212 of the fuel cell 20 or fuel cell stack 12 in the fuel cell system 10/13 after accounting for any uncertainties in the fuel cell system 10/13. The nominal mole fraction of the water flow stream 236 entering the anode inlet manifold 404 or anode inlet 212 of the fuel cell 20 or fuel cell stack 12 ($y_{\_H2O\_AIM\_NOM}$) in the fuel cell system 10/13 may be determined based on the nominal entrainment ratio ($ER_{NOM}$).

The nominal mole fraction of the water flow stream 236 entering the anode inlet manifold 404 or anode inlet 212 of the fuel cell 20 or fuel cell stack 12 ($y_{\_H2O\_AIM\_NOM}$), the ambient pressure ($P_{AMB}$), the anode fuel cell or anode fuel cell stack operating temperature may be used to determine the nominal relative humidity of the of the water flow stream 236 entering the anode inlet manifold 404 or anode inlet 212 of the fuel cell 20 or fuel cell stack 12. In some other embodiments, the nominal mole fraction of the water flow stream 236 entering the anode inlet manifold 404 or anode inlet 212 of the fuel cell 20 or fuel cell stack 12 ($y_{\_H2O\_AIM\_NOM}$), the ambient pressure ($P_{AMB}$), anode fuel cell or anode fuel cell stack operating temperature may be used to determine the nominal dew point of the water flow stream 236 entering the anode inlet manifold 404 or anode inlet 212 of the fuel cell 20 or fuel cell stack 2.

The excess fuel ratio ($\lambda_{H2}$) in the fuel cell system 10/13 may be set based on the nominal dew point of the water flow stream 236 entering the anode inlet manifold 404 or anode inlet 212 of the fuel cell 20 or fuel cell stack 12. For example, if the target dew point is about 40.4° C., the excess fuel ratio ($\lambda_{H2}$) may be set to about 1.4. If the nominal dew point that accounts for system uncertainties is about 43.9° C., the excess fuel ratio ($\lambda_{H2}$) may be set to about 1.535. If the target dew point is about 40.4° C., and the nominal dew point is about 43.9° C., the difference in temperature ($\Delta T$) due to system uncertainties is about 3.5° C. If the system needs a statistical level of confidence of about 98%, Z may be about 2.05, and the standard deviation $\sigma_{\_T}$ may be about 1.71° C.

The excess fuel ratio ($\lambda_{H2}$) in the fuel cell system 10/13 may be set based on the nominal relative humidity of the water flow stream 236 entering the anode inlet manifold 404 or anode inlet 212 of the fuel cell 20 or fuel cell stack 12. For example, if the target relative humidity is about 30.1%, the excess fuel ratio ($\lambda_{H2}$) may be set to about 1.4. If the nominal relative humidity that accounts for system uncertainties is about 36.1%, the excess fuel ratio ($\lambda_{H2}$) may be set to about 1.535. If the target relative humidity is about 30.1%, and the nominal relative humidity is about 36.1%, the difference in relative humidity ($\Delta RH$) is about 6%. If the system needs a statistical level of confidence of about 98%, Z may be about 2.05, and the standard deviation 6 RH may be about 2.9%.

In one embodiment, a target entrainment ratio may be determined by the target relative humidity based on the anode inlet manifold temperature. If the target relative humidity is based on the anode inlet manifold temperature, the target relative humidity may need to be adjusted to account for any difference in temperature between the anode inlet manifold temperature and the anode fuel cell or anode fuel cell stack operating temperature. The nominal entrainment ratio ($ER_{NOM}$) may need to be adjusted to account for any difference in temperature between the anode inlet manifold temperature and the anode fuel cell or anode fuel cell stack operating temperature and for any uncertainties in the fuel cell system 10/13.

The sensors 265 used in the fuel cell system 10/13 may need to be regenerated. For example, if the sensors 265 are exposed to an environment that may saturate the sensor 265, the sensors 265 may need to be exposed to an environment to recover nominal performance. The sensors 265 may be regenerated proactively to retain nominal performance. The sensors 265 may be regenerated once about every 24 hours to about every 48 hours, once about every 48 hours to about every 72 hours, once about every 72 hours to about every 96 hours, once about every 96 hours to about every 120 hours, once about every 120 hours to about every 148 hours, once about every 148 hours to about every 172 hours, once about every 172 hours to about every 300 hours, once about every 300 hours to about every 600 hours, once about every 600 hours to about every 1000 hours, once about every 1000 hours to about every 2000 hours, or once about every 2000 hours to about every 3000 hours, including any specific time or range comprised therein.

The sensors 265 may be recalibrated after regeneration to correct for long term drift. This may be done every regeneration, or once every 5 or 10 regenerations. The time between recalibrations may be based on operating conditions. Regeneration of sensors 265 may comprise disallowing the flow stream 236 entering the anode inlet manifold 404 or anode inlet 212 of the fuel cell 20 or fuel cell stack 12 to flow into the sensors 265. In other embodiments, the dry supply fuel (e.g., $H_2$) may be used as a reference stream with 0% water content, and may be used to dry out or zero the sensor. The dry fuel supply (e.g., $H_2$) in the primary flow stream 202/420 may be used as a reference point for calibrating the saturated stream, i.e. the recirculation flow stream 226. In a further embodiment, the flow stream exiting the anode outlet 214 may be used as a reference stream with about 100% relative humidity.

One or more controller(s) 292 in the fuel cell system 10/13 may control the sensors 265 used to determine the relative humidity and/or dew point temperature at different locations in the fuel cell system 10/13. In some embodiments, if the uncertainty in the entrainment ratio calculation is more than about 12% or if the uncertainty associated with the sensors is more than about 3% of the relative humidity, the method of determining the entrainment ratio (ER) based on the humidity levels in the flow streams in the fuel cell system 10/13 may be used by the controller 292 as a diagnostic tool.

One or more sound sensors 269 may be used to correlate the speed of sound measurements in the anode inlet manifold 404 or anode inlet 212 of the fuel cell 20 or fuel cell stack 12 to the composition and/or humidity level of the flow stream in the anode inlet manifold 404 or anode inlet 212 of the fuel cell 20 or fuel cell stack 12. The one or more sound sensors 269 may be used to sense pressure oscillations may be vibration sensors or piezo sensors. The speed of sound and/or the sound intensity may vary with frequency and/or may depend of the change in the pressure oscillations at a particular frequency.

In one embodiment, since the speed of sound in dry fuel (e.g., $H_2$) is different from the speed of sound (a) in a dry fuel and water mixture, the measurements may provide information about the composition of the hydrogen and water mixture.

$$a=\sqrt{\gamma RT_{FS}} \quad (17)$$

$\gamma R$ is a function of the composition of the flow stream, a is the speed of sounds, and $T_{FS}$ is the temperature of the flow stream. The temperature of the flow stream ($T_{FS}$) may be the anode fuel cell or anode fuel cell stack operating temperature. $\gamma R$ may be determined from a look-up table or from empirical calculations.

The sound sensors 269 may be recalibrated or regenerated. The sound sensors 269 may be recalibrated using a reference gas. In other embodiments, the sound sensors 269 may be regenerated or recalibrated in a manner similar to the humidity sensors 265. Alternatively, or additionally, sound sensors 269 and/or humidity sensors 265 may be used across the by-pass valve 410.

In one embodiment, the one or more controller(s) 292 for monitoring and/or controlling the operation of the recirculation pump or blower 220, measuring and/or controlling the excess flow ratio ($\lambda$) or entrainment ratio (ER) may be implemented, in some cases, in communication with hardware, firmware, software, or any combination thereof present on or outside the in the fuel cell system 10/13 comprising the fuel cell 20 or fuel cell stack 12. In some embodiments, the one or more controller(s) 292 for monitoring and/or controlling the physical or virtual sensors 262, 263, 265, 269 used in the fuel cell system 10/13 may be implemented, in some cases, in communication with hardware, firmware, software, or any combination thereof present on or outside the fuel cell system 10/13 comprising the fuel cell 20 or fuel cell stack 12. Information may be transferred to the one or more controllers using any one or more communication technology (e.g., wired or wireless communications) and associated protocols (e.g., Ethernet, InfiniBand®, Wi-Fi®, Bluetooth®, WiMAX, 3G, 4G LTE, 5G, etc.) to effect such communication.

In one embodiment, the one or more controller(s) 292 may be in a computing device. The computing device may be embodied as any type of computation or computer device capable of performing the functions described herein, including, but not limited to, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and a mobile computing device.

The computing device may include an input/output (I/O) subsystem, a memory, a processor, a data storage device, a communication subsystem, a controller, and a display. The computing device may include additional and/or alternative components, such as those commonly found in a computer (e.g., various input/output devices), in other embodiments. In other embodiments, one or more of the illustrative components may be incorporated in, or otherwise form a portion of, another component. For example, the memory, or portions thereof, may be incorporated in the processor.

The following described aspects of the present invention are contemplated and non-limiting:

A first aspect of the present invention relates to a fuel cell stack system. The fuel cell stack system includes a first flow stream, a second flow stream, and a controller. The first flow stream and the second flow stream mix to form a third flow stream, and the third flow stream flows through an anode inlet manifold in a fuel cell stack of the fuel cell stack system. The second flow stream is a recirculated flow stream. The controller compares an excess fuel ratio of the fuel cell stack system to a target excess fuel ratio of the fuel cell stack system based on water content in the first flow stream, the second flow stream, and the third flow stream.

A second aspect of the present invention relates to a method of determining an excess fuel ratio of a fuel cell stack system. The method includes the steps of flowing a first flow stream and a second flow stream, mixing the first flow stream and the second flow stream to form a third flow stream, flowing the third flow stream flowing through an anode inlet manifold in a fuel cell stack, and comparing an excess fuel ratio of the fuel cell stack system to a target excess fuel ratio of the fuel cell stack system based on water content in the first flow stream, the second flow stream, and the third flow stream by a controller. The second flow stream is a recirculated flow stream.

In the first and second aspect of the present invention, the fuel cell stack system may further include a blower, an ejector, or a by-pass valve. In the first and second aspect of the present invention, the controller may determine and/or the method may further include the controller determining when to operate the blower or may determine blower speed based on the excess fuel ratio. In the first and second aspect of the present invention, the controller may determine and/or the method may further include the controller determining the operation of the by-pass valve based on the excess fuel ratio. In the first and second aspect of the present invention, the fuel cell stack system may include at least a first ejector and a second ejector, and the controller may determine and/or the method may further include the controller determining whether to operate the first ejector, the second ejector, or both the first and second ejectors depending on the excess fuel ratio.

In the first and second aspect of the present invention, the fuel cell stack system may include at least one physical or virtual sensor. In the first and second aspect of the present invention, the physical or virtual sensor may have a humidity sensor at the anode inlet manifold. The humidity sensor may determine a humidity measurement at the anode inlet manifold.

In the first and second aspect of the present invention, the controller may determine and/or the method may further include the controller determining a high humidity threshold and a low humidity threshold based on an effective dryness at the anode inlet manifold depending on operating conditions comprising temperature, pressure, or current density or based on conditions that can cause starvation or flooding within the fuel cell stack. The controller may determine and/or ther method may further include the controller determining a target usable parameter based on the high humidity threshold and the low humidity threshold. The target usable parameter may include a target dew point at a given pressure condition, or a target entrainment ratio of the fuel cell stack system.

In the first and second aspect of the present invention, the controller may convert and/or the method may further include the controller converting the humidity measurement to a measured usable parameter. The measured usable parameter may include a measured dew point at a given pressure condition, or a measured entrainment ratio of the fuel cell stack system. The controller may compare and/or the method may further include the controller comparing the measured usable parameter to a target usable parameter. In the first and second aspect of the present invention, the controller may determine and/or the method may further include the controller determining operation or speed of a blower, operation of a by-pass valve, or operation of one or more ejectors in the fuel cell stack system based on the comparison between the target usable parameter and the measured usable parameter.

In the first and second aspect of the present invention, the humidity sensor may be regenerated, and/or the method may further include regenerating the humidity sensor. The frequency of regeneration may depend on operating conditions of the fuel cell stack system, time of operation the fuel cell stack system or performance diagnostics of the humidity sensor. In the first and second aspect of the present invention, the humidity sensor may be regenerated by using dry hydrogen gas and/or the method may further include regenerating the humidity sensor by using dry humidity gas. In the first and second aspect of the present invention, the humidity sensor may be recalibrated, and/or the method may further include recalibrating the humidity sensor. The frequency of recalibration may depend on operating conditions of the fuel cell stack system. In the first and second aspect of the present invention, the humidity sensor may be recalibrated and/or the method may further include recalibrating the humidity sensor by using dry hydrogen gas or a wet recirculation stream.

In the first and second aspect of the present invention, the physical or virtual sensor may be located in the second flow stream or in the third flow stream.

In the first and second aspect of the present invention, the physical or virtual sensor may be a sound sensor at the anode inlet manifold. The sound sensor may determine a speed of sound measurement at the anode inlet manifold.

In the first and second aspect of the present invention, the controller may determine and/or the method may further include the controller determining a high humidity threshold and a low humidity threshold based on an effective dryness at the anode inlet manifold depending on operation conditions comprising temperature, pressure, or current density or based on conditions that can cause starvation or flooding at the anode inlet manifold. The controller may determine and/or the method may further include the controller determining a target usable parameter based on the high humidity threshold and the low humidity threshold. The target usable parameter may include a target speed of sound.

In the first and second aspect of the present invention, the controller may convert and/or the method may further include the controller converting the speed of sound measurement to a measured usable parameter. The controller may compare and/or the method may further include the controller comparing the measured usable parameter to a target usable parameter. In the first and second aspect of the present invention, the controller may determine and/or the method may further include the controller determining operation or speed of a blower, operation of a by-pass valve, or operation of one or more ejectors in the fuel cell stack system based on a comparison between the target usable parameter and the measured usable parameter.

In the first and second aspect of the present invention, the sound sensor may be recalibrated, and/or the method may further include recalibrating the sound sensor. The recalibration may be done using at least one reference gas.

In the first and second aspect of the present invention, the physical or virtual sensor may include a first virtual sensor and a second virtual sensor. The first virtual sensor and the second virtual sensor may determine and/or the method may further include the first virtual sensor and the second virtual sensor determining the entrainment ratio of the fuel cell stack system.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated.

Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third," and the like, as used herein do not denote any order or importance, but rather are used to distinguish one element from another. The term "or" and "and/or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell stack system comprising:
a first flow stream and a second recirculated flow stream mixing to form a third flow stream,
a blower,
the third flow stream flowing through an anode inlet manifold in a fuel cell stack, and
a controller configured to compare
an excess fuel ratio of the fuel cell stack system to a target excess fuel ratio of the fuel cell stack system based on data regarding water content in the second recirculated flow stream,
wherein the excess fuel ratio is equal to $[(1-x_{H2O\_RC}-x_{N2\_RC})m_{RC}+m_{H2\_P}]/[m_{H2\_P}]$, and wherein $x_{H2O\_RC}$ is a mass fraction of water in the second recirculated flow stream, $x_{N2\_RC}$ is a mass fraction of nitrogen in the second recirculated flow stream, $m_{RC}$ is a mass flow rate of the second recirculated flow stream, $m_{H2\_P}$ is a mass flow rate of fuel in the first flow stream, and
wherein the controller is configured to determine when to operate the blower based on the excess fuel ratio.

2. The system of claim 1, wherein the fuel cell stack system further comprises an ejector or a by-pass valve.

3. The system of claim 2, wherein the controller is configured to determine and adjust a blower speed based on the excess fuel ratio.

4. The system of claim 2, wherein the controller is configured to determine operation of the by-pass valve based on the excess fuel ratio.

5. The system of claim 2, wherein the fuel cell stack system comprises at least a first ejector and a second ejector, and the controller is configured to determine whether to operate the first ejector, the second ejector, or both the first and second ejectors depending on the excess fuel ratio.

6. The system of claim 1, wherein the fuel cell stack system comprises at least one physical or virtual sensor.

7. The system of claim 6, wherein the physical or virtual sensor is a humidity sensor at the anode inlet manifold, and wherein the humidity sensor is configured to determine a humidity measurement at the anode inlet manifold.

8. The system of claim 7, wherein the controller is configured to determine a high humidity threshold and a low humidity threshold based on an effective dryness at the anode inlet manifold depending on operating conditions comprising temperature, pressure, or current density, wherein the controller is configured to determine a target usable parameter based on the high humidity threshold and the low humidity threshold, and wherein the target usable parameter comprises a target dew point at a given pressure condition, or a target entrainment ratio of the fuel cell stack system.

9. The system of claim 8, wherein the controller is configured to convert the humidity measurement to a measured usable parameter, wherein the measured usable parameter comprises a measured dew point at a given pressure condition, or a measured entrainment ratio of the fuel cell stack system, and wherein the controller is configured to compare the measured usable parameter to the target usable parameter.

10. The system of claim 9, wherein the controller is configured to determine operation or a speed of the blower, operation of a by-pass valve, or operation of one or more ejectors in the fuel cell stack system based on the comparison between the target usable parameter and the measured usable parameter.

11. The system of claim 7, wherein the humidity sensor is regenerated, and wherein the frequency of regeneration depends on operating conditions of the fuel cell stack system, time of operation of the fuel cell stack system, or performance diagnostics of the humidity sensor.

12. The system of claim 7, wherein the humidity sensor is regenerated by using dry hydrogen gas.

13. The system of claim 6, wherein the at least one physical or virtual sensor is a sound sensor at the anode inlet manifold, and wherein the sound sensor is configured to determine a speed of sound measurement at the anode inlet manifold.

14. The system of claim 13, wherein the controller is configured to determine a high humidity threshold and a low humidity threshold based on an effective dryness at the anode inlet manifold depending on operation conditions comprising temperature, pressure, or current density, wherein the controller is configured to determine a target usable parameter based on the high humidity threshold and the low humidity threshold, and wherein the target usable parameter comprises a target speed of sound.

15. The system of claim 14, wherein the controller is configured to convert the speed of sound measurement to a measured usable parameter, and wherein the controller is configured to compare the measured usable parameter to the target usable parameter.

16. The system of claim 15, wherein the controller is configured to determine operation or a speed of the blower, operation of a by-pass valve, or operation of one or more ejectors in the fuel cell stack system based on a comparison between the target usable parameter and the measured usable parameter.

17. A method of determining an excess fuel ratio of a fuel cell stack system comprising:
flowing a first flow stream and a second recirculated flow stream,
mixing the first flow stream and the second recirculated flow stream to form a third flow stream,
flowing the third flow stream through an anode inlet manifold in a fuel cell stack, and
comparing an excess fuel ratio of the fuel cell stack system to a target excess fuel ratio of the fuel cell stack system based on data regarding water content in the second recirculated flow stream via a controller,
wherein the excess fuel ratio is equal to $[(1-x_{H2O\_RC}-x_{N2\_RC})m_{\_RC}+m_{\_H2\_P}]/[m_{\_H2\_P}]$, and wherein $x_{\_H2O\_RC}$ is a mass fraction of water in the second recirculated flow stream, $x_{\_N2\_RC}$ is a mass fraction of nitrogen in the second recirculated flow stream, $m_{\_RC}$ is a mass flow rate of the second recirculated flow stream, and $m_{\_H2\_P}$ is a mass flow rate of fuel in the first flow stream, and
determining, via the controller, when to operate a blower based on the excess fuel ratio.

18. The method of claim 17, wherein the method further comprises determining, via the controller, a blower speed, or determining, via the controller, the operation of a by-pass valve based on the excess fuel ratio.

19. The method of claim 17, wherein the fuel cell stack system comprises at least one physical or virtual sensor, and wherein the physical or virtual sensor is a humidity sensor at the anode inlet manifold, and wherein the method further comprises determining, via the humidity sensor, a humidity measurement at the anode inlet manifold.

20. The method of claim 17, wherein the fuel cell stack system comprises at least one physical or virtual sensor, and wherein the physical or virtual sensor is a sound sensor at the anode inlet manifold, and wherein the method further comprises determining, via the sound sensor, a speed of sound measurement at the anode inlet manifold.

* * * * *